United States Patent
Kato et al.

(10) Patent No.: US 6,791,776 B2
(45) Date of Patent: Sep. 14, 2004

(54) APPARATUS FOR INFORMATION RECORDING AND REPRODUCING

(75) Inventors: Takatoshi Kato, Yokohama (JP); Takushi Nishiya, Machida (JP); Hideyuki Yamakawa, Fujisawa (JP); Takashi Nara, Takasaki (JP); Nobuaki Nakai, Takasaki (JP); Hiroshi Ide, Takasaki (JP); Shintaro Suzumura, Yokohama (JP); Terumi Takashi, Chigasaki (JP)

(73) Assignees: Hitachi, Ltd., Tokyo (JP); Hitachi Video and Information System, Inc., Tokyo (JP)

( * ) Notice: Subject to any disclaimer, the term of this patent is extended or adjusted under 35 U.S.C. 154(b) by 334 days.

(21) Appl. No.: 09/793,924

(22) Filed: Feb. 28, 2001

(65) Prior Publication Data

US 2001/0043416 A1 Nov. 22, 2001

(30) Foreign Application Priority Data

Apr. 26, 2000 (JP) .................................... 2000-131523
Jul. 6, 2000 (JP) .................................... 2000-210687

(51) Int. Cl.[7] ............................................. G11B 5/09
(52) U.S. Cl. ........................ 360/39; 360/51; 360/48; 360/65; 360/26; 360/53; 360/54; 360/62; 369/53.34; 369/47.28
(58) Field of Search .......................... 360/39, 46, 48, 360/51, 65, 53–54, 62, 26; 369/47.28, 53.34; G11B 5/09, 20/10

(56) References Cited

U.S. PATENT DOCUMENTS

| 5,781,590 A | * | 7/1998 | Shiokawa et al. | ........... 375/341 |
| 5,867,333 A | * | 2/1999 | Saiki et al. | ................... 360/51 |
| 5,872,666 A | * | 2/1999 | Saiki et al. | ................... 360/46 |
| 6,208,481 B1 | * | 3/2001 | Spurbeck et al. | ............. 360/65 |
| 6,532,122 B1 | * | 3/2003 | Sugawara et al. | ............ 360/46 |
| 6,560,053 B1 | * | 5/2003 | Ohta et al. | ..................... 360/51 |

OTHER PUBLICATIONS

Sawaguchi et al., "Performance Analysis of Decision–Feedback Equalization with Maximum–Likelihood Detector in High–Density Recording Channels", Nov. 1995, IEEE Trasactions on Magnetics, vol. 31, No. 6, pp. 3063–3065.*

Higashino et al., "A Reduced High Dimensional FDTS for Magneto–Optical Recording", Sep. 1997, IEEE Transactions on Magnetics, vol. 33, No. 5, pp. 3268–3270.*

* cited by examiner

*Primary Examiner*—David Hudspeth
*Assistant Examiner*—Natalia Figueroa
(74) *Attorney, Agent, or Firm*—Antonelli, Terry, Stout & Kraus, LLP

(57) ABSTRACT

In order to generate a sampling clock having a higher accuracy, a synchronous signal generating circuit is provided with a phase error detector, detecting a phase error of a read out signal digitized on the basis of FDTS algorithm, and a VCO, controlling an oscillation frequency on the basis of a phase error detected by the phase error detector, to generate a synchronous signal by the VCO. On the basis of the synchronous signal generated by the synchronous signal generating circuit, an ADC digitizes the read out signal. The digitized read out signal is then converted to binary data by a detection circuit.

8 Claims, 19 Drawing Sheets

FIG.7
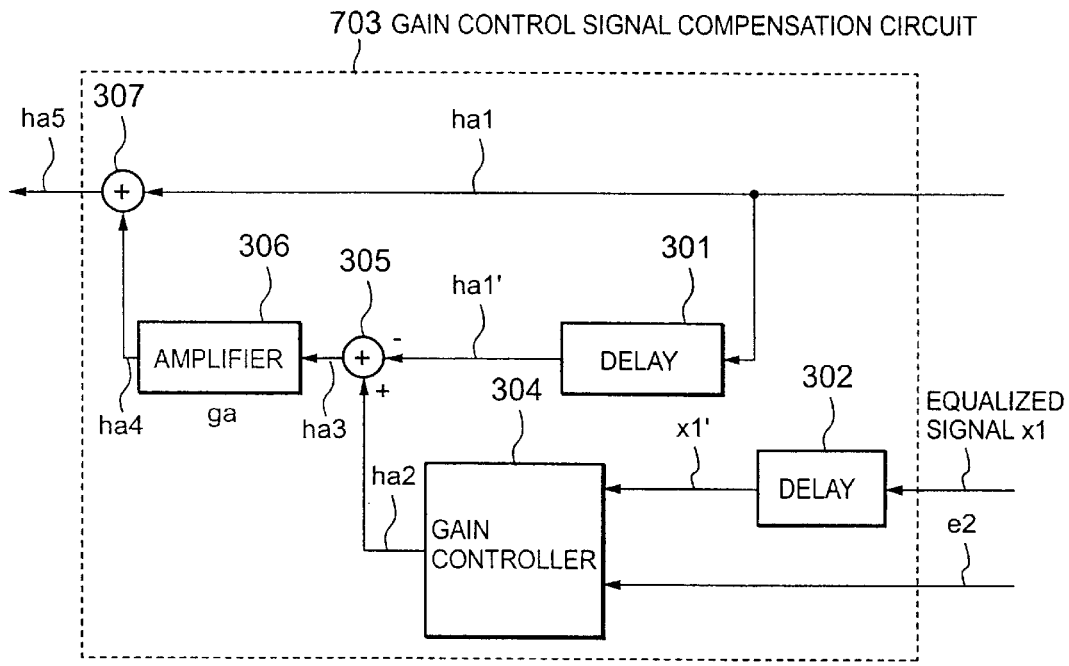
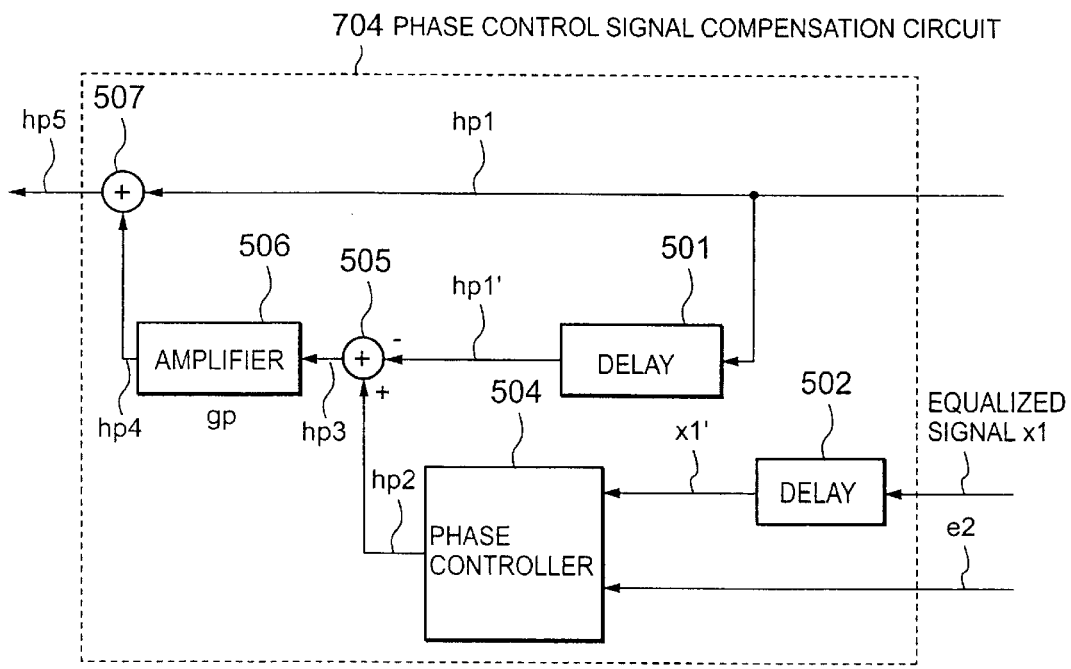

APPARATUS FOR INFORMATION RECORDING AND REPRODUCING

This application claims a priority based on Japanese Patent Application Nos. 2000-131523 and 2000-210687 filed on Apr. 26, 2000, and Jul. 6, 2000, respectively, the entire contents of which are incorporated herein by reference for all purposes.

FIELD OF THE INVENTION

The present invention relates to a digital data recording and reproducing apparatus, in particular, to a signal processing circuit which effectively carries out signal processing such as reading out from a recording medium by controlling a phase-looked loop circuit and a variable-gain-amplifier with a partial response maximum likelihood decoding (hereinafter abbreviated as PRML), and to a digital data regenerating apparatus using the signal processing circuit.

BACKGROUND OF THE INVENTION

With increasing recording densities in recording units represented by hard disk drives, various technologies have been devised. In particular, about a recording and reproducing method, the PRML has become generally in use to which technologies in communication field are applied.

The partial response (PR) is a system of reproducing data by actively making use of inter-symbol interference (ISI) (interference between regenerated signals corresponding to bits recorded adjacent to each other) with a necessary signal bandwidth compressed. The system may be further classified into a plurality of classes depending on the way of generating this inter-symbol interference. A PR target for magnetic recording is based on the PR in class 4 (PR4).

In addition, among decoding methods, the Viterbi decoding (ML) is a kind of maximum likelihood sequence estimation system which carries out data regeneration on the basis of information of signal gains over a plurality of time units by effectively making use of disciplined ISI (Inter-Symbol-Interference) of regenerated waveforms.

A system of regenerating data by combining the above described PR and ML is named as PRML.

The above-described PRML are provided in a number of variations depending on disciplined ISI of given waveforms, In particular, in the magnetic disk drive, used are such systems as PRML, EPRML (Extended PRML), EEPRML (Extended EPRML), and MEEPRML (Modified EEPRML).

A digital data regenerating apparatus using the PRML like the above is disclosed in, for example, JP-A-8-287607. In general, in a magnetic disc drive, information in magnetized form is read out as electric signals to be outputted as digitized information by a data regenerating circuit.

Processing corresponding to the above-described PRML is carried out in the data regenerating circuit. A read-back signal, being inputted to the data regenerating circuit, is appropriately processed before being converted to a digital signal by an analog to digital converter. A sampling clock for the conversion is generated in a synchronous signal generation circuit.

The synchronous signal generation circuit is constituted to have a phase error detector, a loop filter, and a VCO. The phase error detector obtains phase error between phases of a sampling timing of a sampled signal and an originally expected correct sampling timing. The loop filter carries out appropriate filtering processing of the obtained phase error signal. The VCO generates the sampling clock while controlling its oscillation frequency on the basis of the output signal of the loop filter.

Here, it is necessary for the synchronous signal generation circuit to generate from the generated signal itself a highly accurate sampling clock in synchronism with the regenerated signal. Moreover, by making the phase error detector provided with a high performance, data regenerating performance can be improved and faulty locking of the synchronous signal can be prevented. Such a phase error detector is disclosed in, for example, JP-A-10-125008 or JP-A-7-192406.

SUMMARY OF THE INVENTION

However, even with the phase error detector provided with a high performance, there still remains following problem.

Namely, when degradation of the signal recorded on a recording medium, increase in noise in a signal processing circuit, and an error in parameter setting in the signal processing circuit cause considerable degradation in quality of the signal inputted to the phase error detector, temporary quality degradation in a control signal causes further degradation in quality of the input signal to the phase error detector. This will sometimes induce continuous detection error that leads to further degradation in the control signal. Occurrence of such a phenomenon increases a bit error rate of a signal at the output of the signal processing circuit thereby to degrade the performance of the whole system.

The detection made by a detector in related art, for example, a detector included in a phase control circuit disclosed in JP-A-8-287607, is provided without sophisticated decoding such as the maximum likelihood decoding that requires considerable time delay until the signal is outputted. Thus, no consideration is given to the above problem.

As a countermeasure against the above problem, each of JP-A-10-293973 and JP-A-9-17130 discloses that the output of Viterbi detecting circuit for data regeneration is used as a reference signal for phase comparison. This can sufficiently lower a probability of detection error occurrence to allow the phase error to be accurately detected.

However, detection of data with Viterbi algorithm requires so long a delay time for data detection that no sufficient band can be secured for phase control. Therefore, there arises a problem in that simply adopted Viterbi algorithm will make the control unstable.

Accordingly, it is an object of the present invention to provide a signal processing circuit which can reduce the data error rate therein by using the Viterbi algorithm being adopted.

In order to achieve the above object, the information recording and reproducing apparatus has a data regenerating circuit which regenerates recorded data on the basis of a read out signal read out from a recording medium, a decoding circuit which decodes the recorded data regenerated by the data regenerating circuit, and an interface for outputting externally the recorded data decoded by the decoding circuit.

The data regenerating circuit comprises an analog to digital converting circuit which converts the read out signal from an analog signal to a digital signal, an equalizer which carries out waveform equalization of the read out signal converted to the digital signal, a detector circuit which outputs binary data by carrying out signal detection on the basis of the output signal of the equalizer, and a synchronous signal generating circuit which generates a synchronous signal for determining a sampling timing in the analog to digital converting circuit.

In the preferred embodiment according to the present invention, the synchronous signal generating circuit has a phase error detecting circuit which carries out signal detection of the output signal from the equalizer on the basis of a detection algorithm that provides a shorter response time than that in the Viterbi detector and a higher accuracy than that in signal detection based on a threshold value and detects a phase error on the basis of a result of the signal detection, a loop filter which is connected to the output side of the phase error detecting circuit, and a variable frequency oscillation circuit which generates on the basis of the output of the loop filter a synchronous signal given to the analog to digital converting circuit.

As a different embodiment of the present invention, a signal processing circuit according to the present invention is characterized by comprising a variable-gain-amplifier which adjusts a gain of a regenerated signal regenerated from a recording medium, an analog to digital converter which carries out sampling of the regenerated signal outputted from the variable-gain-amplifier to output a digital data signal, an oscillator which generates a clock signal supplied to the analog to digital converter, a maximum likelihood detector which carries out maximum likelihood detecting about the digital data signal, a decoder which carries out decoding of data recorded on the recording medium from an output value of the maximum likelihood detector, a detector which detects the digital data signal, a first error signal generator which generates a first error signal from the result of the detection of the detector, a second error signal generator which generates a second error signal with a higher accuracy than that of the first error signal, and a control signal generator which generates a phase control signal that controls, on the basis of the first and second error signals and the digital data signal, a gain control signal that controls a gain of the variable-gain-amplifier and at least one of a phase and frequency of the clock signal generated by the oscillator.

In the different embodiment according to the present invention, the second error signal is obtained as a result of detection employing the maximum likelihood detection. More specifically, the second error signal generator carries out maximum likelihood detection about a value obtained from an intermediate stage of a memory path constituting the maximum likelihood detector, with the result thereof used as the second error signal.

BRIEF DESCRIPTION OF THE DRAWINGS

FIG. 7 is a block diagram showing variations of configurations of the gain control signal compensation circuit and the phase control signal compensation circuit in the first embodiment;

DESCRIPTION OF THE PREFERRED EMBODIMENTS

Figure 1:
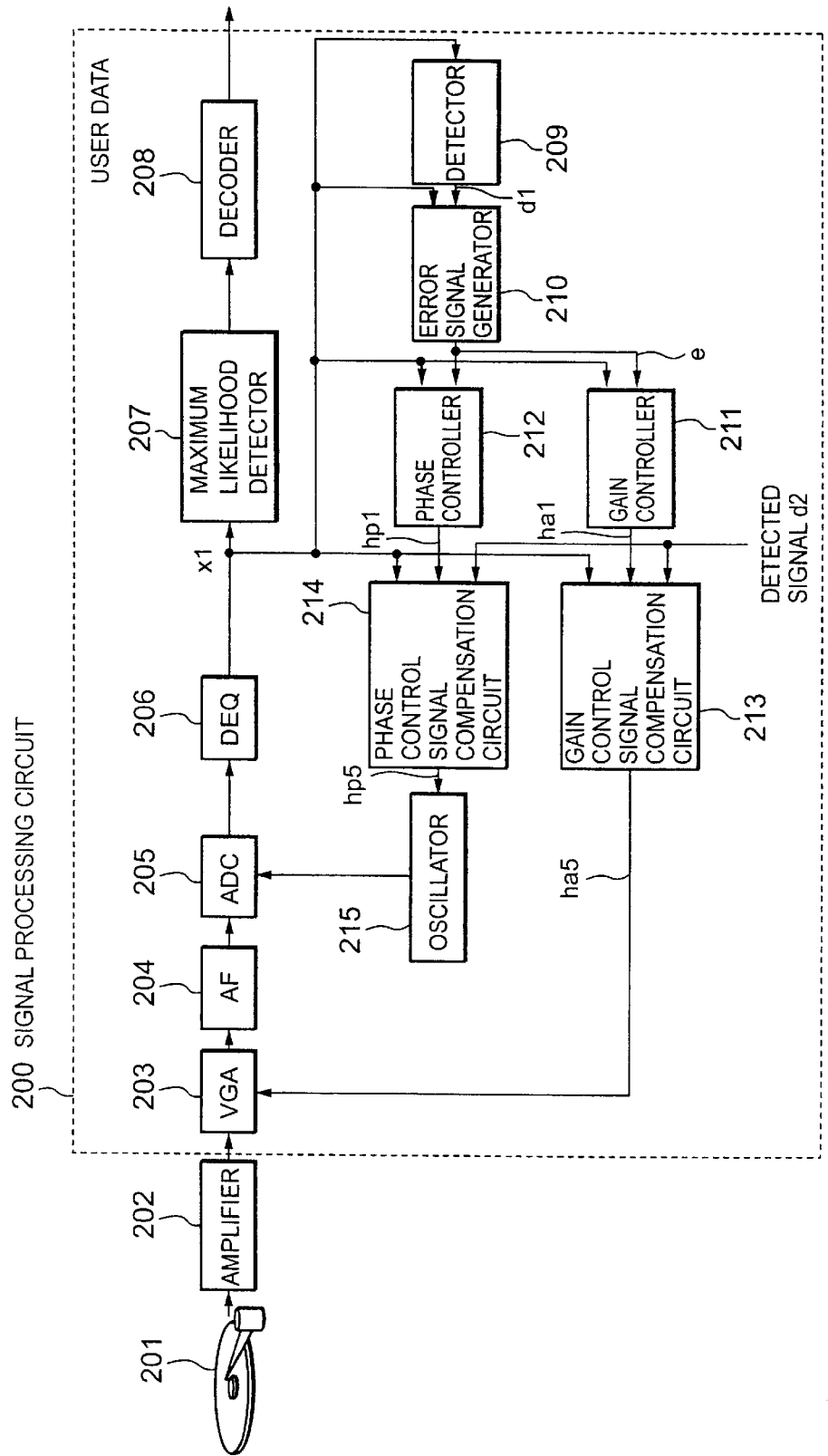
FIG. 1 is a block diagram showing a configuration of a signal regeneration system in a first embodiment according to the present invention.

FIG. 1 is a block diagram showing a configuration of a magnetic disk drive including a phase control circuit and a gain control circuit in a first embodiment of the present invention.

Digital data written to a recording medium is read out by a head 201 and amplified by an amplifier 202. The amplified signal is then inputted to a signal processing circuit 200.

The signal inputted to the signal processing circuit 200 is adjusted to have an appropriate amplitude by a variable-gain-amplifier (VGA) 203 and sent to an analog filter (AF) 204. The AF 204 removes from an output of the VGA 203 higher frequency components, which will become noises when a sampling of the output is carried out in a ADC 205, and along with this, carries out waveform shaping of the output.

A signal outputted from the AF 204 is converted to a digital signal by the A/D converter (ADC) 205. The digital signal is then inputted to a digital equalizer (DEQ) 206 to be subjected to waveform equalization. When the waveform equalization is sufficiently carried out by the AF 204, the DEQ 206 may be unnecessary. A maximum likelihood detector 207 receives an output of the DEQ 206, which output has been subjected to the waveform equalization, to carry out maximum likelihood detecting. The detected signal is decoded by a decoder 208 to become an output of the signal processing circuit 200. The output of the signal processing circuit 200 is transmitted to a host such as a computer outside the magnetic disk drive through a hard disk controller (HDC)

The output signal of the DEQ 206 is also inputted to a detector 209. At the detector 209, a temporary detected signal d1 is prepared to be provided to an error signal generator 210. The error signal generator 210 generates an error signal e by using the detection signal d1 of the detector 209 and the output signal of the DEQ 206.

By using the error signal e, a gain controller 211 generates a gain control signal ha1, which is transmitted to a gain control signal compensation circuit 213. The gain control signal compensation circuit 213, by using a second detected signal d2 generated at the maximum likelihood detector 207 as will be described later and provided from outside of the compensation circuit, compensates the gain control signal ha1 to carry out gain control of the VGA 203 as will be described later.

By using the error signal e, a phase controller 212 generates a phase control signal hp1, which is transmitted to a phase control signal compensation circuit 214. The phase control signal compensation circuit 214, by using the second detected signal d2 provided from outside of the compensation circuit, compensates the phase control signal hp1 to control an oscillator 215. The oscillator 215 supplies a clock signal to digital operation blocks such as the ADC 205, DEQ 206, and maximum likelihood detector 207.

Figure 2:
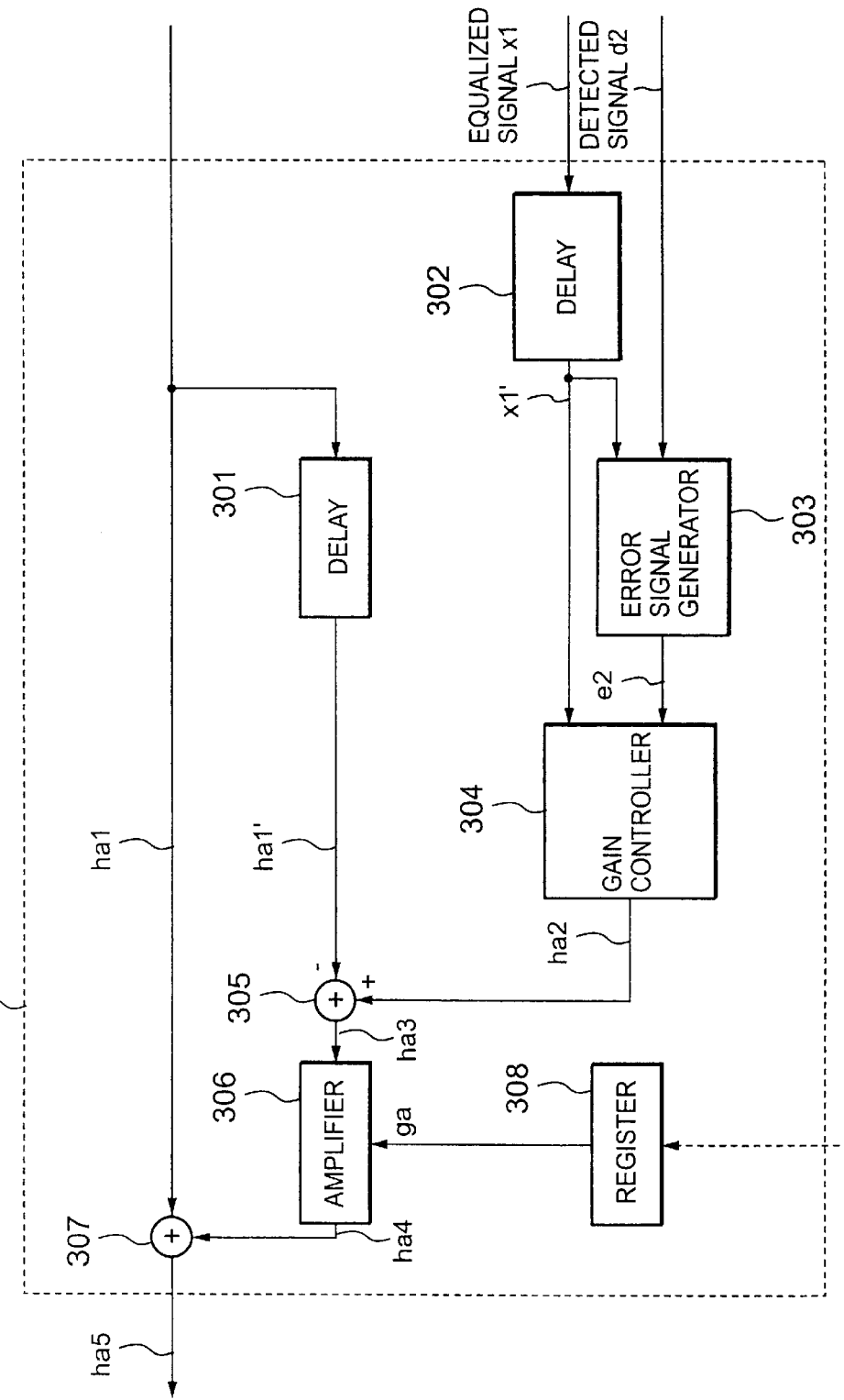
FIG. 2 is a block diagram showing a configuration of a gain control signal compensation circuit in the first embodiment.

FIG. 2 is a block diagram showing a configuration of the gain control signal compensation circuit 213 in the first, embodiment of the present invention.

The gain control signal ha1 is inputted to a delay 301 to be delayed by a difference between the amount of clock delay of the detected signal d1 and that of the second detected signal d2. An output signal of the delay 301 becomes a delayed gain control signal ha1'. An equalized signal x1 is delayed by a delay 302 similarly by the difference between the amount of clock delay of the detected signal d1 and that of the second detected signal d2 to become an equalized signal x1'.

The delayed equalized signal x1' and the second detected signal d2 are inputted to an error signal generator 303 operating similarly to the error signal generator 210. On the basis of those values, the error signal generator 303 outputs an error signal e2. The delayed equalized signal x1' and the error signal e2 are inputted to a gain controller 304 operating similarly to the gain controller 211. On the basis of these signals, the gain controller 304 outputs a gain control signal ha2.

The gain control signal ha2 and the delayed gain control signal ha1' are inputted to a subtracter 305, which outputs a difference ha3 between the gain control signal ha2 and the delayed gain control signal ha1'. Here, the relation ha3=ha2−ha1' holds. The difference ha3 is multiplied by a predetermined gain ga at an amplifier 306 to be provided as a compensation signal ha4. The gain ga is determined by a degree with which the level of the gain control signal approaches such an appropriate level that the compensation of the gain signal becomes possible. The gain ga becomes 1 when the amounts of clock delays of the detected signal d1 and the detected signal d2 are small and approaches zero as the amounts of the clock delays increases.

The compensation signal ha4 is added to the gain control signal ha1 by an adder 307 to be provided as an output ha5 of the gain control signal compensation circuit 213, Here, the relation ha5=ha1+ha4 holds. The output ha5 is provided as a control signal of the VGA 203. The gain ga of the amplifier 306 can be adjusted outside the compensation circuit by a register 308.

Figure 3:
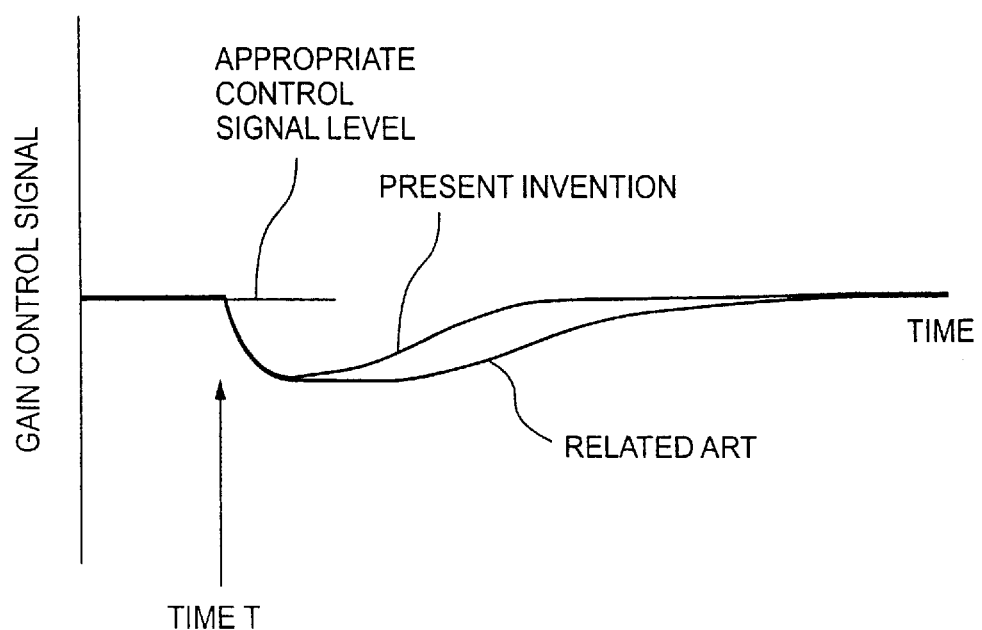
FIG. 3 is a characteristic diagram showing a behavior of a gain control signal in the first embodiment.

FIG. 3 is a diagram in which the gain control signal when the control signal ha5 in the embodiment is used is compared with that when the control signal in the related art is used which corresponds to the gain control signal ha1.

In the embodiment, when the delay times of the detected signal d1 and the second detected signal d2 are elapsed from a time T, by the use of the second detected signal d2 having a low detection error rate, a detection error is detected in the gain control signal compensation circuit 213 and the compensation signal ha4 compensates the gain control signal ha1. Therefore, compared with the case in the related art in which the gain control signal corresponding to the gain control signal ha1 is directly inputted to the VGA, the gain can be recovered earlier to the correct one as shown in FIG. 3.

The phase control signal compensation circuit 214 compensates the phase control signal hp1 with the second detected signal d2 having low detection error rate taken as input thereto.

Figure 4:
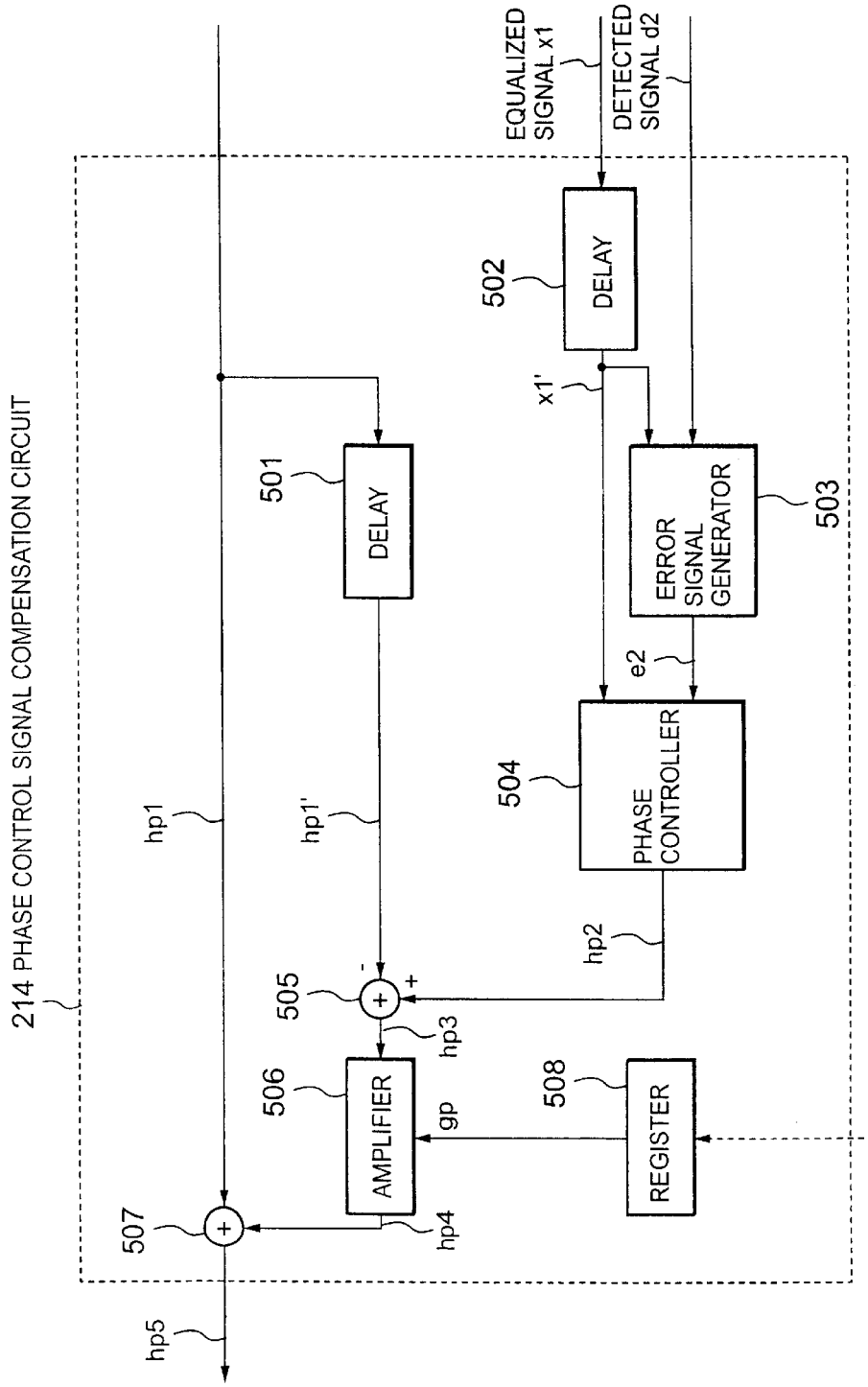
FIG. 4 is a block diagram showing a configuration of a phase control signal compensation circuit in the first embodiment.

FIG. 4 is a block diagram showing a configuration of the phase control signal compensation circuit 214 in the embodiment.

The phase control signal hp1 is inputted to a delay 501 to be delayed by a difference between the amount of clock delay of the detected signal d1 and that of the second detected signal d2. An output signal of the delay 501 becomes a delayed phase control signal hp1'. The equalized signal x1 is inputted to a delay 502 and delayed by a difference between the amount of clock delay of the detected signal d1 and that of the second detected signal d2 to become an equalized signal x1'.

An error signal generator 503 operating similarly to the error signal generator 210 outputs the error signal e2 with the delayed equalized signal x1' and the second detected signal d2 provided as inputs. A phase controller 504 operating similarly to the phase controller 212 outputs a phase control signal hp2 with the delayed equalized signal x1' and the error signal e2 provided as inputs. The phase control signal hp2 and the delayed phase control signal hp1' are inputted to a subtracter 505, which outputs a difference hp3 between the phase control signals hp2 and the delayed phase control signal hp1'. Here, the relation hp3=hp2−hp1' holds.

The difference hp3 is multiplied by a predetermined gain gp at an amplifier 506 to be provided as a compensation signal hp4. The gain gp is determined by taking into account a degree with which the level of the phase control signal approaches such an appropriate level that the compensation of the phase signal becomes possible. The gain gp becomes 1 when the amounts of clock delays of the detected signal d1 and the detected signal d2 are small and approaches zero as the amounts of the clock delays increases.

The compensation signal hp4 is added to the phase control signal hp1 by an adder 507 to be provided as an output hp5 of the phase control signal compensation circuit 214. Here, the relation hp5=hp1+hp4 holds. The output hp5 is provided as a control signal of the oscillator 215. The gain gp of the amplifier 506 can be adjusted from outside of the compensation circuit by a register 508.

Figure 5:
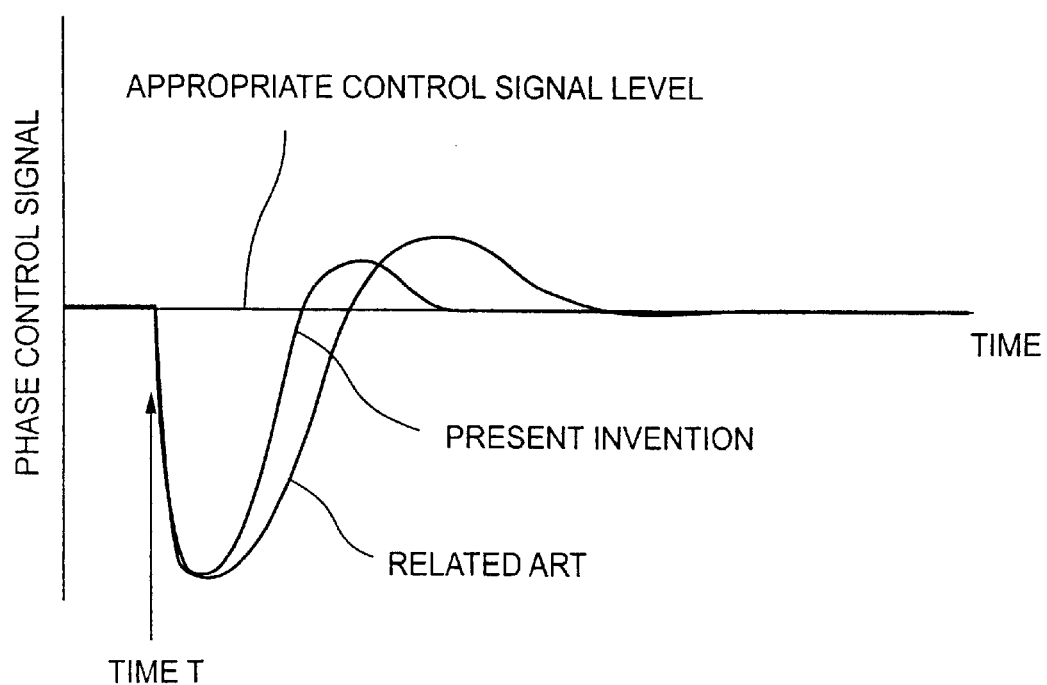
FIG. 5 is a characteristic diagram showing a behavior of a phase control signal in the first embodiment.

FIG. 5 is a diagram in which the phase control signal when the control signal hp5 in the embodiment is used is compared with that when the control signal in the related art is used which corresponds to the phase control signal hp1.

In the embodiment, when the delay times of the detected signal d1 and the second detected signal d2 are elapsed from a time T, by the use of the second detected signal d2 having a low detection error rate, a detection error is detected in the phase control signal compensation circuit 214 and the compensation signal hp4 compensates the phase control signal hp1. Therefore, compared with the case in the related art in which the phase control signal corresponding to the phase control signal hp1 is directly inputted to the oscillator 215, the phase can be recovered earlier to the correct one.

Figure 8:
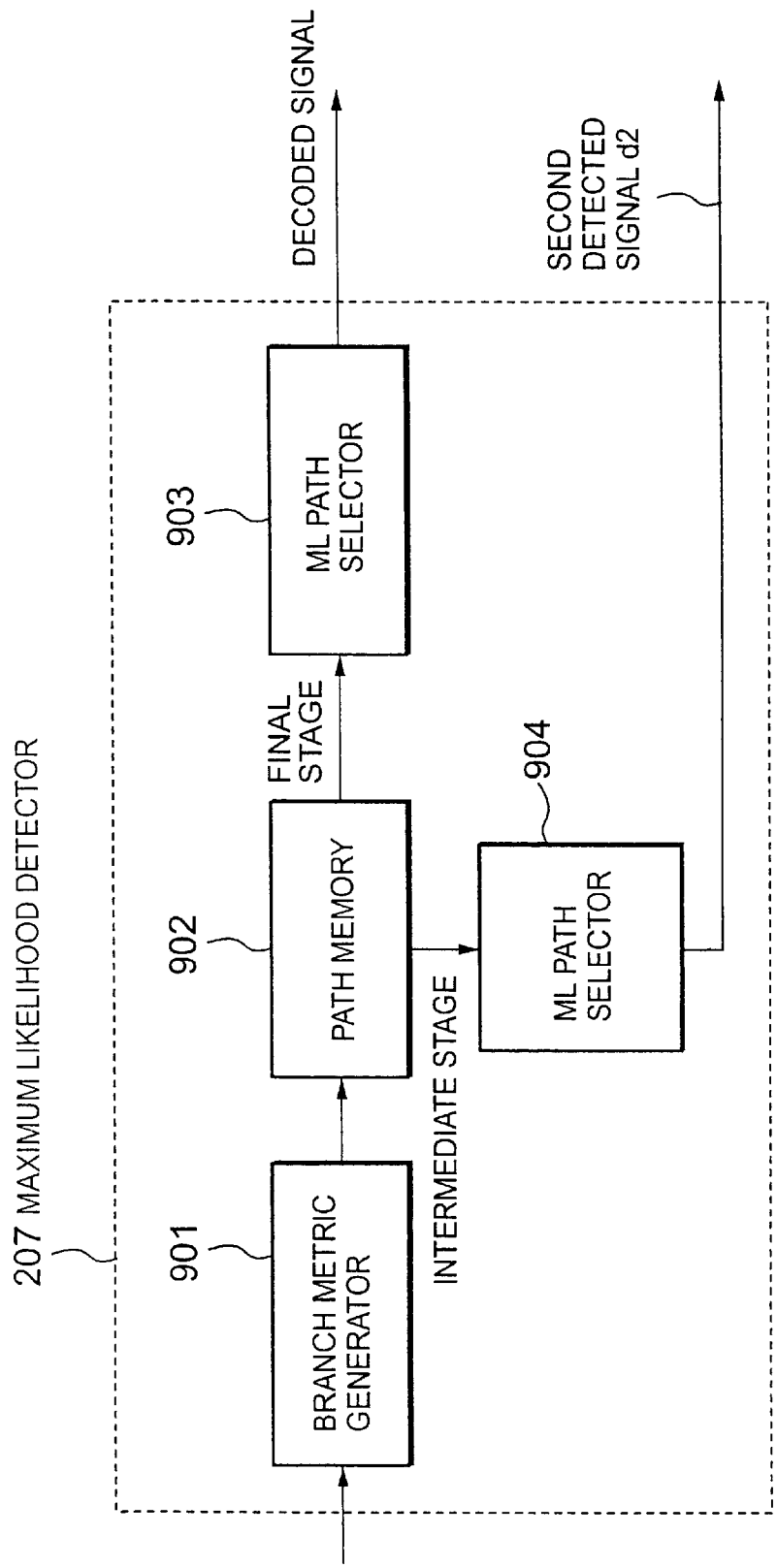
FIG. 8 is a block diagram showing a configuration of a maximum likelihood detector.

FIG. 8 is a block diagram showing a configuration of the maximum likelihood detector 207. The second detected signal d2 having been explained is generated by the maximum likelihood detector 207.

A signal is first inputted to a branch metric generator 901. The branch metric generator 901 carries out an arithmetic operation each time about an Euclidean distance between the inputted signal value and a desired signal value corresponding to each branch of a transition on the trellis diagram. At each time, the branch metric generator 901 stores in a path memory 902 the branch path metric signal of the maximum likelihood path out of paths to the present state and the state of the maximum likelihood path at one time unit before the present.

The path memory 902 copies contents of a shift register which correspond to the state outputted from the previous stage one time unit before the present. An ML path selector 903 calculates out a decoded signal, which is estimated by using the contents of the final stage of the path memory 902 and the branch path metric signal of the maximum likelihood path outputted from the stage previous to the final stage. The calculated decoded signal is made as an output of the maximum likelihood detector 207.

An ML path selector 904 operates similarly to the ML path selector 903. The ML path selector 904 inputs the branch path metric signal of the maximum likelihood path outputted from the previous stage and contents of the intermediate stage of the path memory 902, and outputs the second detected signal d2. There is a higher probability that the second detected signal d2 causes detection error compared with that of the decoded signal taken as the output of the maximum likelihood detector 207. However, compared with the detected signal d1 generated by the detector 209, there is a lower probability that the detected signal causes the detection error.

Thus generated detected signal d2 is, as explained above, supplied to the phase control signal compensation circuit 214, and the gain control signal compensation circuit 213.

In the embodiment, the second detected signal d2 is generated by the ML path selector 904 inputted with the contents of the intermediate stage of the path memory 902. However, the output signal of the ML path selector 903 may be directly used as the second detected signal d2. When the output signal of the ML path selector 903 is different from the detected signal at the time the output of the DEQ 206 is provided, an appropriate inter-symbol interference is given to estimate the detected signal. However, the path memory 902 is designed so as to take sufficiently long period until the estimated decoded signal is determined. Therefore, such a configuration increases the delay between the detected signal d1 and the detected signal d2 to extend a period for restoring the control signal to an appropriate value in the phase control signal compensation circuit 214 and the gain control signal compensation circuit 213.

According to the embodiment, the gain control circuit and the phase control circuit can carry out decoding with a satisfactory error rate without becoming out of control due to detection error both in gain and phase control even under a condition with poor signal to noise ratio of the regenerated signal.

The signal processing circuit described as the embodiment is applied to a recording and reproducing apparatus such as a magnetic disk drive such that occurrence of data error can be prevented from occurring due to degradation of quality of the regenerated signal. This makes it possible to increase the recording density to be higher or to reduce cost by degrading performance of recording media, heads, and motors.

Figure 6:
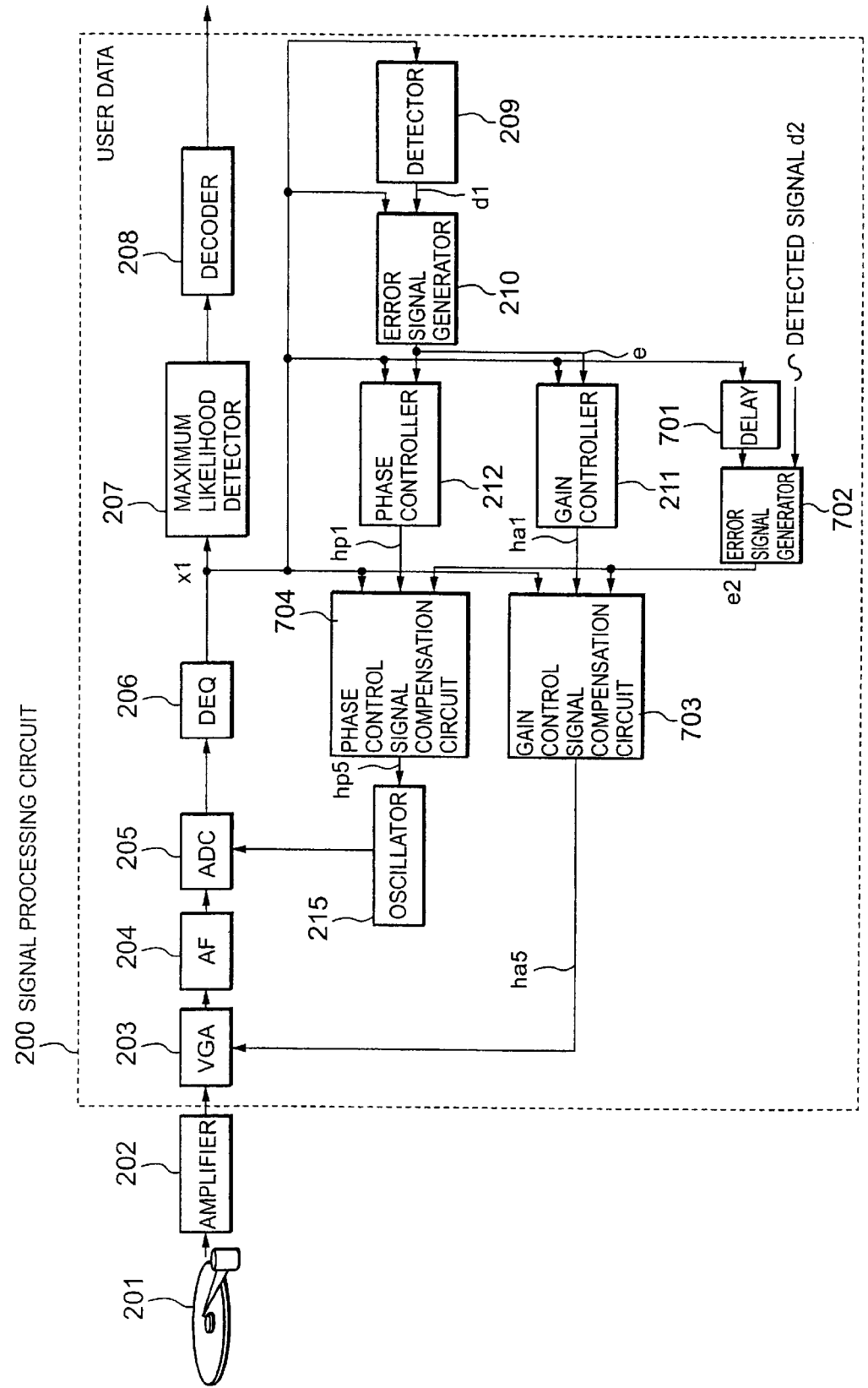
FIG. 6 is a block diagram showing a configuration of a variation of the signal regeneration system in the first embodiment.

FIG. 6 is a block diagram showing a configuration of a signal processing circuit as a variation of the first embodiment according to the present invention. In the diagram, the circuits designated with the same reference numerals as those in the explanation of the first embodiment operate similarly to the corresponding circuits in the first embodiment. Therefore, explanations about the operations of the circuits will be omitted in the following.

By using the error signal e, the gain controller 211 generates the gain control signal ha1, which is transmitted to a gain control signal compensation circuit 703.

A delay 701 delays the output of the DEQ 206 by the summation of the delayed periods of the second detected signal d2 and the detected signal outputted from the detector 209. The delayed output of the DEQ 206 is inputted to an error signal generator 702. The error signal generator 702 generates an error signal e2 from the second detected signal d2 and the delayed output of the DEQ 206.

The gain control signal compensation circuit 703, by using the error signal e2, the gain control signal ha1, and the equalized signal x1, compensates the gain control signal ha1 to carry out gain control of the VGA 203 as will be described later.

The phase controller 212, by using the error signal e, generates the phase control signal hp1, which is transmitted to a phase control signal compensation circuit 704. The phase control signal compensation circuit 704, by using the error signal e2, the phase control signal hp1, and the equalized signal x1, compensates the phase control signal hp1 to control an oscillator 215.

FIG. 7 is a block diagram showing configurations of the gain control signal compensation circuit 703 and the phase control signal compensation circuit 704.

The gain control signal compensation circuit 703 and the phase control signal compensation circuit 704 according to the embodiment, compared with the gain control signal compensation circuit 213 shown in FIG. 2 and the phase control signal compensation circuit 214 shown in FIG. 4, have no error signal generators 303 and 503, respectively, with the error signal e2 supplied from outside. Except this, the gain control signal compensation circuit 703 and the phase control signal compensation circuit 704 operate similarly to the gain control signal compensation circuit 213 and the phase control signal compensation circuit 214 in the first embodiment, respectively.

Figure 9:
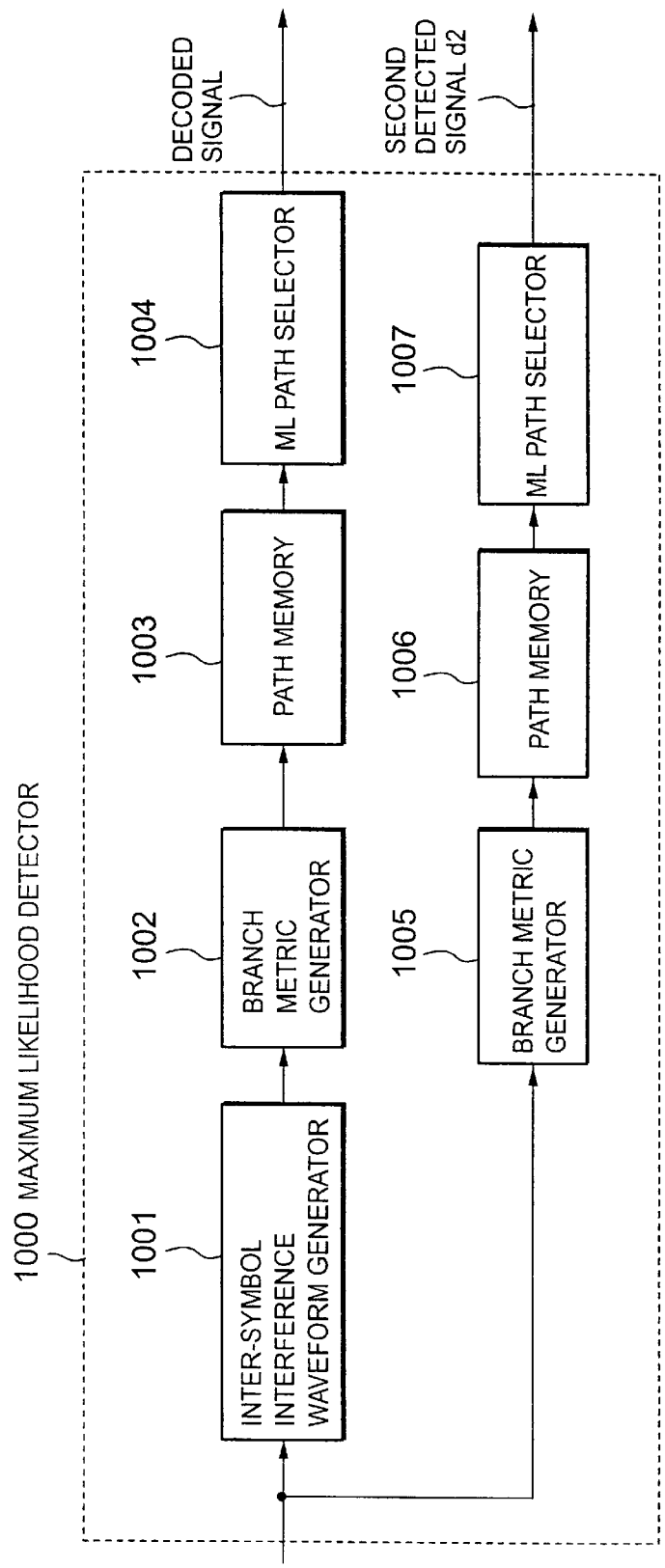
FIG. 9 is a block diagram showing another example of a configuration of the maximum likelihood detector.

FIG. 9 is a block diagram showing a configuration of a maximum likelihood detector 1000 as a variation of the maximum likelihood detector 207 in the first embodiment of the present invention. In the previously described embodiment, the configuration of the maximum likelihood detector 207 can be also substituted by the maximum likelihood detector 1000 shown in FIG. 9 so as to have a configuration explained in the following.

The maximum likelihood detector 1000 is different from the maximum likelihood detector 207 in having two kinds of partial responses for being used.

In the maximum likelihood detector 1000, a signal is inputted to an inter-symbol interference generator 1001. The inter-symbol interference generator 1001 provides the inputted signal with higher degree of inter-symbol interference than that provided for the input signal to the maximum likelihood detector 1000. For example, when PR4 interaction is provided for the input signal to the maximum likelihood detector 1000 and EPR4 ML (Extended PR4 ML) is applied to a maximum likelihood detection in the following state, the inter-symbol interference of 1+D is provided so that the inter-symbol interference with the inputted signal meets the design of the following stage.

The signal provided with the inter-symbol interference is inputted to a branch metric generator 1002, Following this, a branch metric generator 1002, a path memory 1003, and an ML path selector 1004 operate similarly to the branch metric generator 901 and corresponding components explained with reference to FIG. 8. Therefore, explanation about them will be omitted.

The second maximum likelihood detector 1000 including a branch metric path 1005, a path memory 1006, and an ML path selector 1007 basically operate similarly to a first maximum likelihood detector comprising the branch metric path 1002, the path memory 1003, and the ML path selector 1004 as a second maximum likelihood detector. The difference is that the second maximum likelihood detector carries out decoding operation with the use of a simpler partial response with less number of states compared with the first maximum likelihood detector.

The ML path selector 1007 calculates out a decoded signal estimated by using the contents of the final stage of the path memory 1006 and the path metric signal of the maximum likelihood path outputted from the stage previous to the final stage, and outputs the decoded signal as the second detected signal d2. There is a higher probability that the second detected signal d2 causes detection error compared with that of the output of the ML path selector 1004, but the probability is lower compared with that of the detector 209 without carrying out the maximum likelihood detection.

Figure 10:
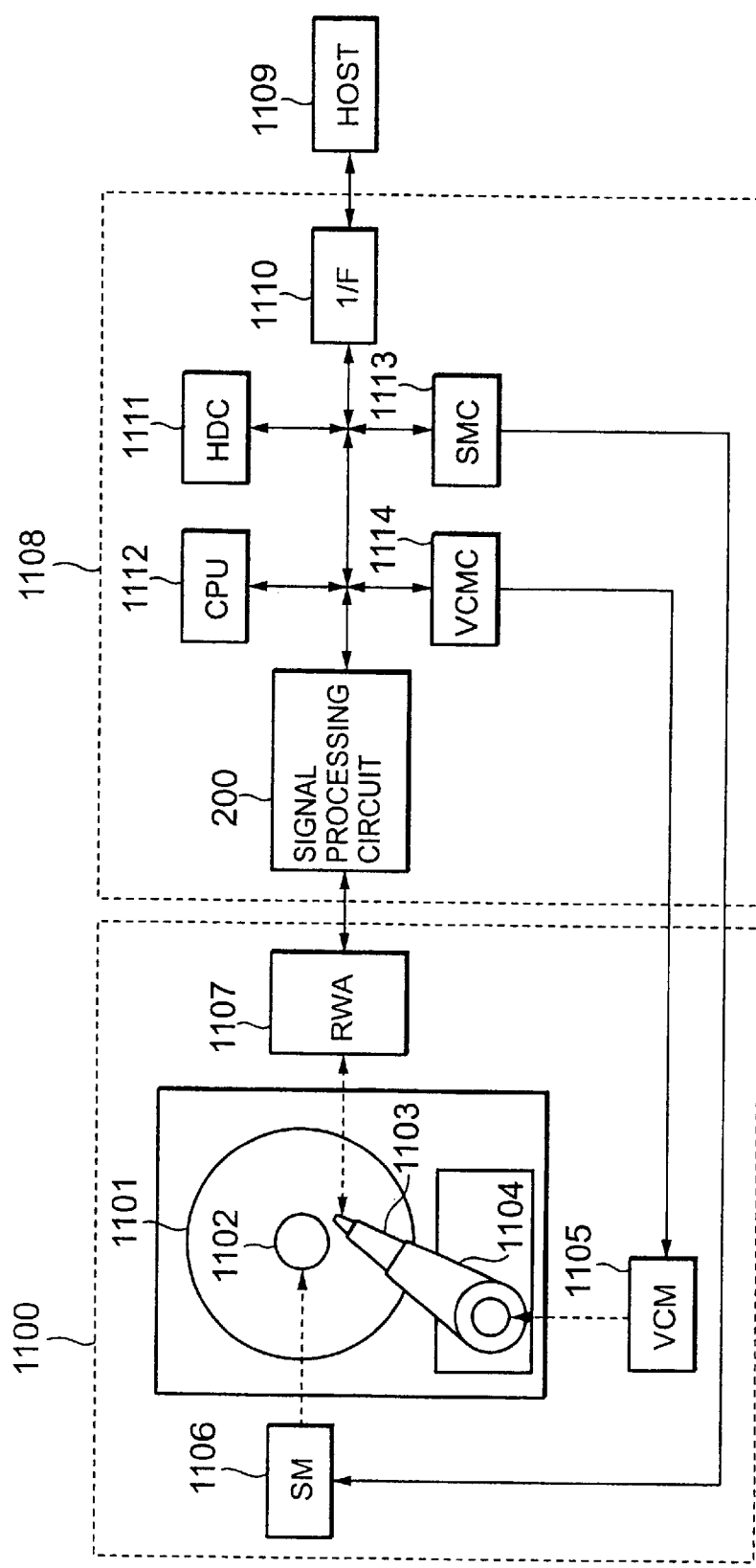
FIG. 10 is a block diagram showing a configuration of a magnetic disk drive using a signal processing circuit to which the present invention is applied.

FIG. 10 is a block diagram showing a configuration of a magnetic disk drive constituted by using the signal processing circuit as described above.

A magnetic disk drive 1100 is constituted to include a magnetic disk 1101 to which data is recorded, a spindle 1102 for rotating the magnetic disk 1101, a magnetic head 1103 which carries out reading out or writing in of data to the magnetic disk 1101, an arm 1104 which supports the magnetic head 1103, a voice coil motor 1105 which moves the magnetic head 1103, a spindle motor 1106 which rotates the spindle 1102, and a read-write amplifier 1107 which amplifies a signal from the magnetic head 1103.

A magnetic disk drive control circuit 1108 has an interface (I/F) 1110 for connecting the circuit 1108 to an information processing unit such as a host (HOST) 1109, a hard disk controller (HDC) 1111 which carries out data passing between the HOST 1109 and the control circuit 1108 and control of data arrangement such as formatting, a microprocessor (CPU) 1112 which carries out various kinds of control in the magnetic disk drive 1100, the signal processing circuit 200 which carries out processing of the signal from the read-write amplifier 1107, a spindle motor control circuit (SMC) 1113 for controlling the spindle motor 1106, and a voice coil motor control circuit (VCMC) 1114 which controls the voice coil motor 1105.

Here, in the signal processing circuit 200, there is employed the signal processing circuit explained as the first embodiment.

When mounting the signal processing circuit 200 on the magnetic disk drive control circuit 1108, an operation becomes necessary for setting the gain ga of the gain control circuit or the gain gp of the phase control circuit depending on qualities of the components such as the recording medium, the head, or the motors. The operation is carried out when carrying out the setting in the magnetic disk drive control circuit 1108 such that the setting of the optimum gains ga and gp is carried out with error rate of the decoded result or equalization error being monitored.

Figure 11:
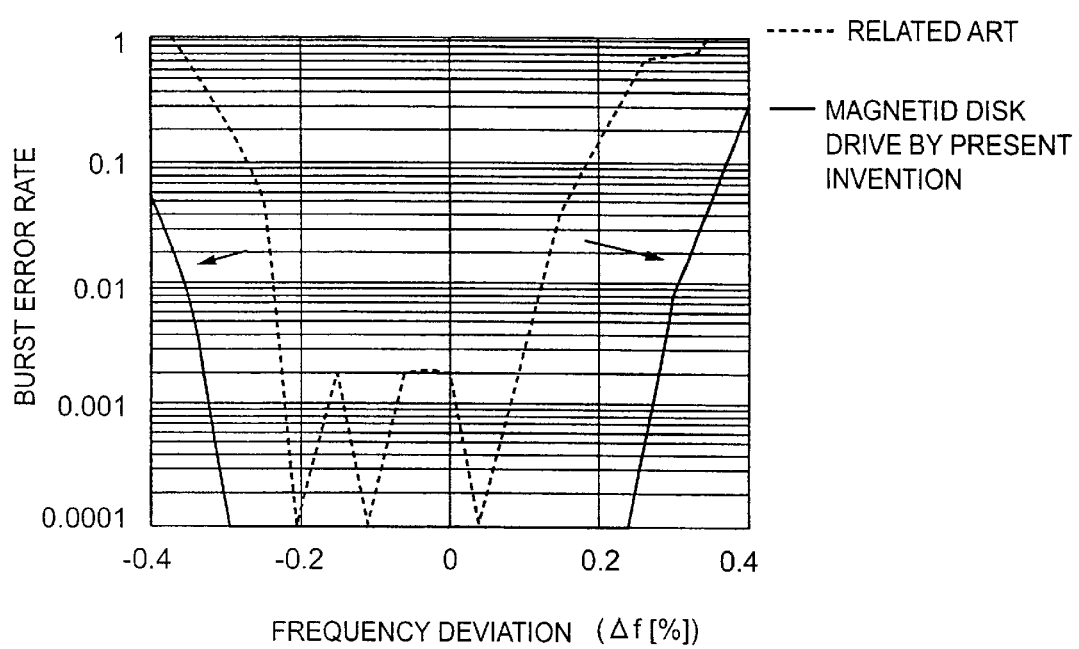
FIG. 11 is a diagram showing results of simulation of burst error rate of the magnetic disk drive.

FIG. 11 is a diagram showing burst error rates in the magnetic disk drives obtained by simulation. The burst error rate in the magnetic disk drive according to the embodiment is shown by solid lines, while a dotted line show a burst error rate in a magnetic disk drive having a circuit with a configuration according to related art. As is found from the diagram, in the magnetic disk drive, to which the present Invention is employed, error rate of a signal can be made lower compared with that in the magnetic disk drive with a circuit configuration according to related art.

In the next, a second embodiment of the present invention will be explained.

Figure 12:
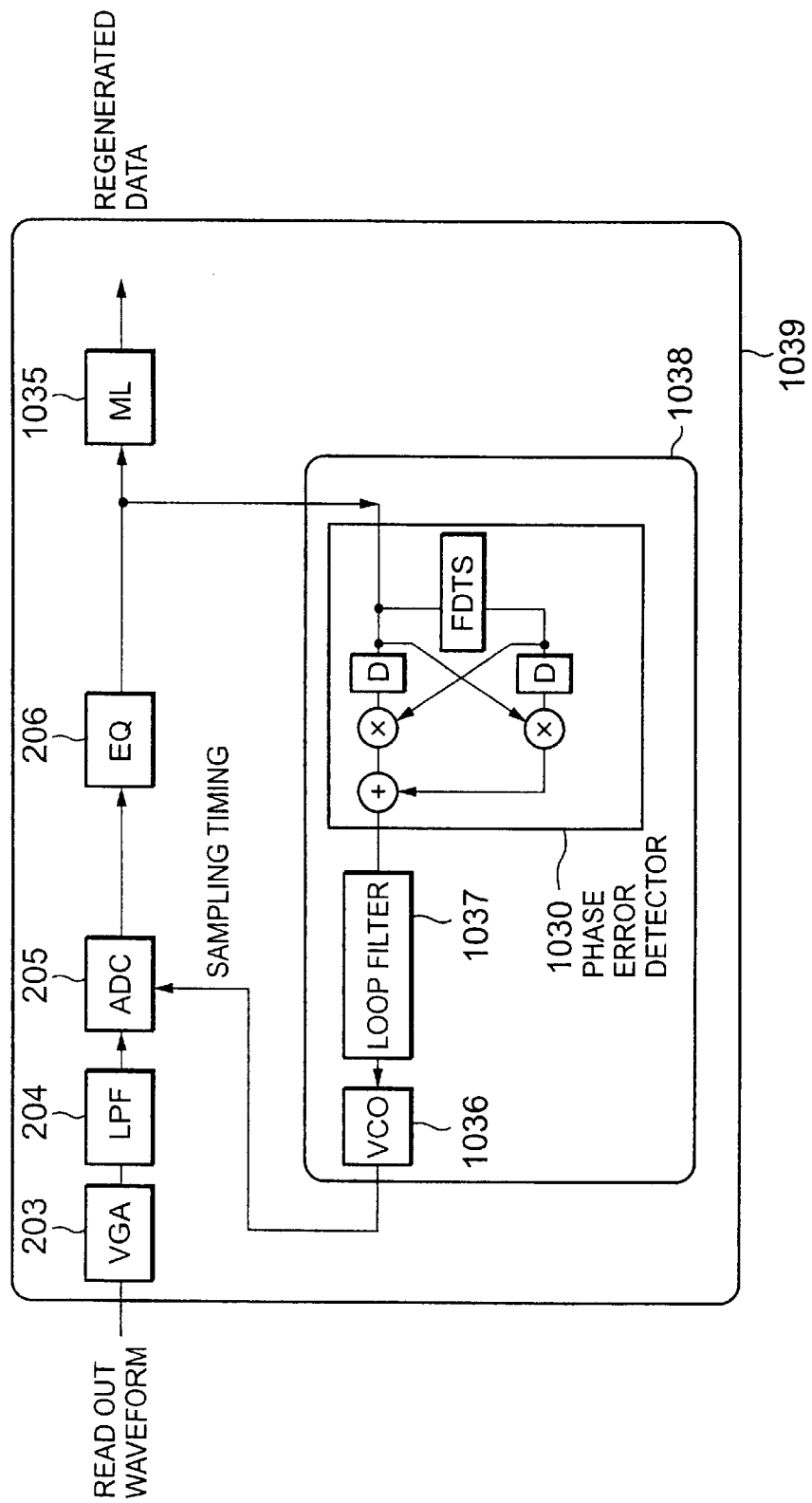
FIG. 12 is a block diagram showing a configuration of a data regenerating circuit as a signal regeneration system in a second embodiment.

FIG. 12 is a block diagram schematically showing a configuration of a data regenerating circuit 1039 as the second embodiment. The data regenerating circuit 1039 corresponds to the signal processing circuit 200 in the first embodiment. In the data regenerating circuit 1039, there is carried out the data regeneration by PRML. In the data generating circuit 1039, the variable-gain-amplifier (VGA) 203, the analog filter (LPF) 204, the analog to digital converter (ADC) 205, and the digital equalizer (EQ) 206 are the same as those in the first embodiment. A Viterbi decoding circuit (ML) 1035 corresponds to the maximum likelihood detector 207 and the decoder 208 in the signal processing circuit 200 in the first embodiment, and carries out data regeneration by the Viterbi algorithm about a signal outputted from the equalizer 206 to decode the signal into binary data. At the same time, the output of the equalizes 206 is also supplied to a synchronous signal generating circuit 1038, which mainly comprises a phase error detector 1030, a loop filter 1037 and a VCO 1036. The synchronous signal generating circuit 1038 generates, on the basis of the signals outputted from the equalizers 206, a sampling clock for determining a timing of sampling at the analog to digital converter 205.

In the following, explanation will be made only about the phase error detector 1030 which is a different part from the first embodiment.

Figure 13:
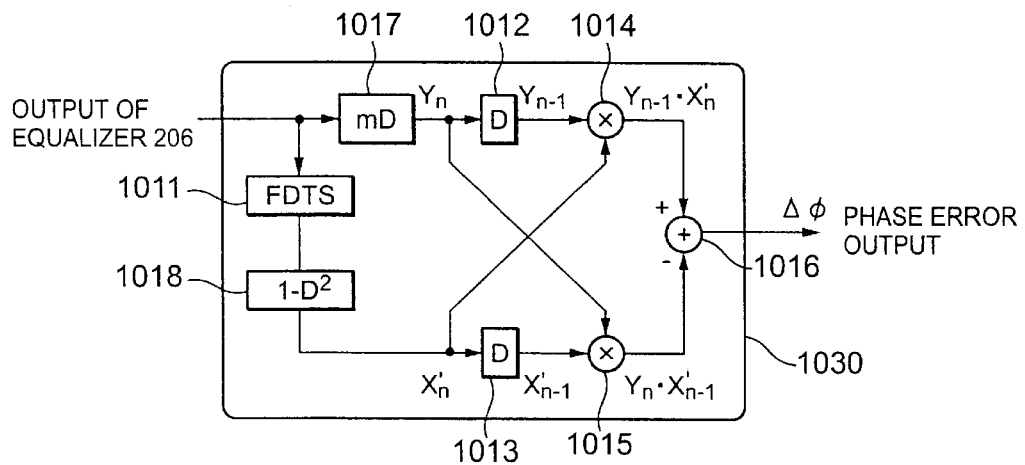
FIG. 13 is a block diagram showing a configuration of a phase error detector in the second embodiment.

FIG. 13 is a block diagram showing a configuration of the phase error detector 1030 to which the second embodiment according to the present invention is applied.

The phase error detector 1030 has delays (D) 1012 and 1013 each being a delaying element by one time unit, multipliers 1014 and 1015 each of which carries out multiplication of two input signals, an adder 1016 which outputs a difference between two signals respectively outputted from the multipliers 1014 and 1015, an FDTS detection circuit 1011, a delay 1017, and an arithmetic circuit 1018. The FDTS detection circuit 1011 carries out signal detection according to an algorithm based on FDTS (Fired Delay Tree Search).

The FDTS applied to the FDTS detection circuit 1011 is disclosed in detail in U.S. Pat. No. 5,136,593.

Letting impulse response from recording to regeneration of the partial response be $\{a_0, a_1, a_2\}$, recorded data be $X_n$ (where, $X_n=\{1, 0\}$), an ideal channel output be $Z_n$, a channel output containing noise be $Y_n$, the following relationships hold as, $$Z_k=X_k \cdot a_0+X_{k-1} \cdot a_1+X_{k-2} \cdot a_2 \qquad (1)$$

$$Y_k=Z_k+N_k \text{ (where, } N_k \text{ is a noise component).} \qquad (2)$$

Here, $X_n$ is a value of either of $\{1, 0\}$. Therefore, possible combinations of $X_n$ within a range of continuous L bits are $2^L$ ways. Therefore, the value of $Z_n$ for each combination can be obtained from the expression (1).

In FDTS, within a predetermined range of L bits, each error between the value of $Z_n$ obtained from the expression (1) and the actually obtained value $Y_n$ is compared with others, and the $Z_n$ for the minimum error is taken as the exact value, with which data is regenerated.

Figure 14:
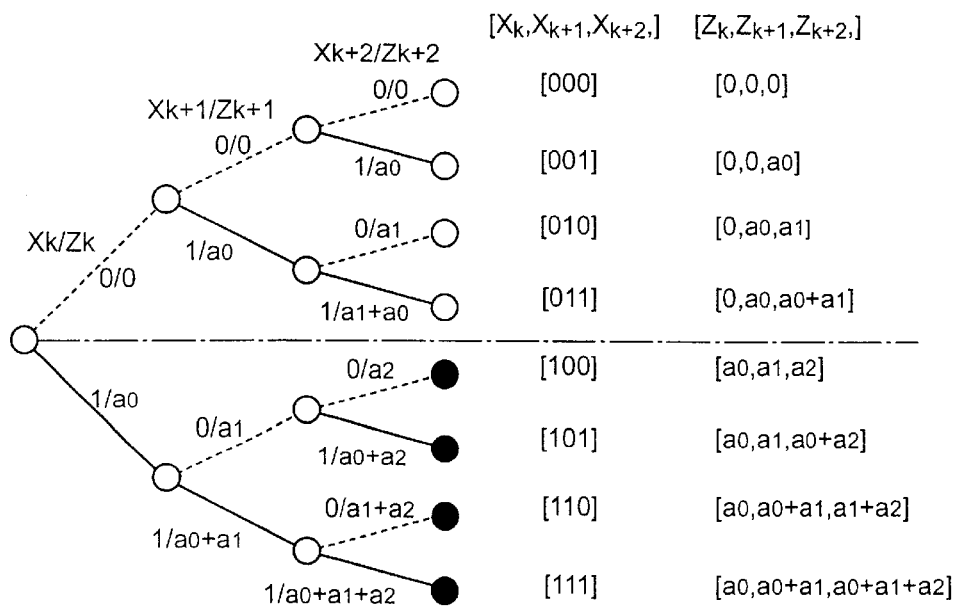
FIG. 14 is a diagram showing a tree structure of an FDTS in the second embodiment.

Supposing that a range of search L is 3 bits, and let $X_n$ under consideration is $\{X_k, X_{k+1}, X_{k+2}\}$, possible combinations of $X_n$ are 8 ways. This is shown in tree-like in FIG. 14. In FIG. 14, an open circle represents a node from which a state makes transition to the next node by a new, input $X_n$. A broken line represents a branch corresponding to $X_n=0$, and a solid line represents a branch corresponding to $X_n=1$. Numerical values in the figure are those of $X_k/Z_k$ corresponding to respective branches, where it is assumed that $X_{k-1}=0$ and $X_{k-3}=0$.

For the combinations of $Z_k$ of 8 ways in total, an evaluation function named as metric is defined as is represented by the expression (3) in order to obtain an error between $Z_k$ and an actual input signal $Y_k$.

$$M(k)=\Sigma(Y_k-Z_k)^2. \qquad (3)$$

In the example shown in FIG. 14, M(k) is given as, $$M(k)=(Y_k-Z_k)^2+(Y_{k+1}-Z_{k-1})^2+(Y_{k+2}-Z_{k+2})^2. \qquad (4)$$

Namely, $$M0(k)=Y_k'^2+Y_{k+1}'^2+Y_{k-2}^2$$

$$M1(k)=Y_k'^2+(Y_{k+1}'^2+Y_{k-2}-a_0)^2$$

$$M2(k)=Y_k'^2+(Y_{k+1}'-a_0)^2+(Y_{k+2}-a_1)^2$$

$$M3(k)=Y_k'^2+(Y_{k+1}'-a_0)^2+(Y_{k+2}-a_0-a_1)^2$$

$$M4(k)=(Y_k'-a_0)^2+(Y_{k+1}'-a_1)^2+(Y_{k+2}-a_2)^2$$

$$M5(k)=(Y_k'-a_0)^2+(Y_{k+1}'-a_1)^2+(Y_{k+2}-a_0-a_2)^2$$

$$M6(k)=(Y_k'-a_0)^2+(Y_{k+1}'-a_0-a_1)^2+(Y_{k+2}-a_1-a_2)^2$$

$$M7(k)=(Y_k'-a_0)^2+(Y_{k+1}'-a_0-a_1)^2+(Y_{k+2}-a_0-a_1-a_2)^2,$$

where $Y_k'$ and $Y_{k+1}'$ are values obtained from the expression (5) below, for which $Y_k$ and $Y_{k+1}$ are compensated, taking inter-symbol interference by known $X_{k-1}$ and $X_{k-1}$ into consideration.

$$Y_k'=Y_k-(a_1 \cdot X_{k-1}+a_2 \cdot X_{k-2}) \quad Y_{k+1}'=Y_{k+1}-(a_2 \cdot X_{k-1}). \qquad (5)$$

Next, eight metric values of M0(k) to M7(k) are compared for the minimum metric to be selected. When the branch corresponding to the selected metric is in the lower half in FIG. 14 (with a node of black circle), $X_k$ is decided as $X_k=1$, and when in the upper half, $X_k$ is decided as $X_k=0$; with which a series of processing for data obtained in one sampling is completed. At the next time k+1, a similar data detection is carried out from the next point to which the selected branch is traced.

Figure 15:
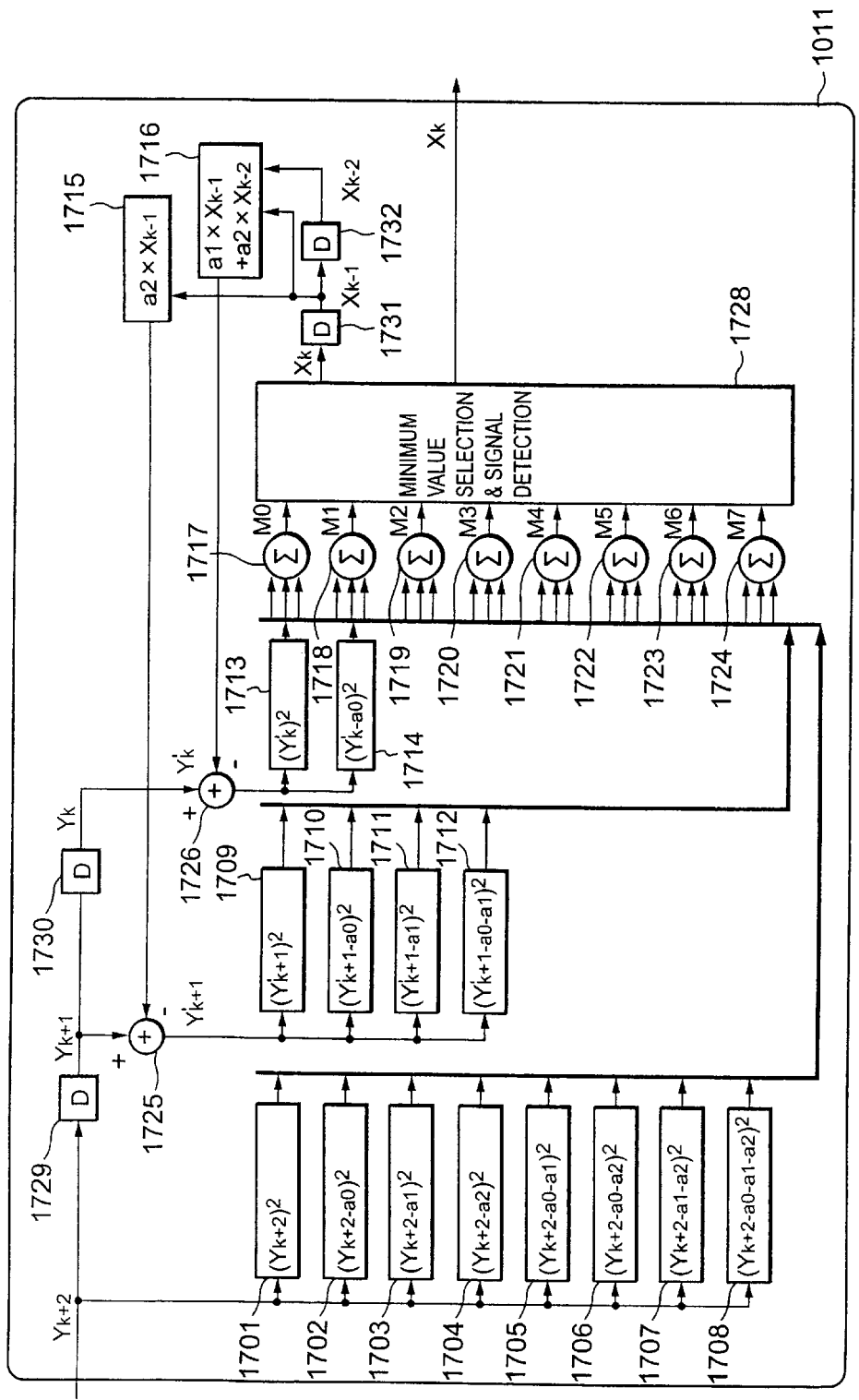
FIG. 15 is a block diagram showing an example of an FDTS detection circuit for realizing an FDTS algorithm.

FIG. 15 is a block diagram showing an example of an FDTS detection circuit for realizing the above described FDTS algorithm.

The FDTS detection circuit 1011 has arithmetic circuits 1701 to 1716, adders 1717 to 1726, delays 1729 to 1732 for providing one time unit delay, and a minimum value selector 1728.

To the FDTS detection circuit 1011, the information is inputted which is subjected to waveform equalization by the equalizer 206 so that the expressions (1) and (2) hold. An input signal at a certain time is taken as $Y_{k+2}$.

The signal inputted to the FDTS detection circuit 1011 is further inputted to the arithmetic circuits 1701 to 1708 and the delay 1729.

The arithmetic circuits 1701 to 1708 carry out arithmetic operations of $(Y_{k+2})^2$, $(Y_{k+2}-a_0)^2$, $(Y_{k+2}-a_1)^2$, $(Y_{k+2}-a_2)^2$, $(Y_{k+2}-a_0-a_1)^2$, $(Y_{k+2}-a_0-a_2)^2$, $(Y_{k+2}-a_1-a_2)^2$, and $(Y_{k+2}-a_0-a_1-a_2)^2$, respectively.

At a time when the signal $Y_{k+2}$ is inputted, the delay 1729 outputs a signal $Y_{k+1}$ inputted one time unit before. The outputted signal is given to the adder 1725 and the delay 1730. The adder 1725 carries out the known compensation of inter-symbol interference shown by the express ion (5). The output signal of the adder 1725 is given to the arithmetic circuits 1709 to 1712.

The arithmetic circuits 1709 to 1712 carry out arithmetic operations of $(Y'_{k+1})^2$, $(Y'_{k+1}-a_0)^2$, $(Y'_{k+1}-a_1)^2$, and $(Y'_{k+1}-a_0-a_1)^2$, respectively.

The delay 1730 outputs an inputted signal with a delay of one time unit. The output signal of the delay 1730 at the time the signal $Y_{k+2}$ is inputted becomes $Y_k$. The output signal of the delay 1730 is given to the adder 1726. The adder 1726 carries out the known compensation of inter-symbol interference shown by the expression (5). The output signal of the adder 1726 is given to the arithmetic circuits 1713 and 1714.

The arithmetic circuits 1713 and 1714 carry out arithmetic operations of $(Y'_k)^2$ and $(Y'_k-a_0)^2$, respectively. The values obtained at the arithmetic circuits 1701 to 1714 are given to the adders 1717 to 1724. In the adders 1717 to 1724, arithmetic operations of previously shown metric values M0(k) to M7(k) are carried out, respectively.

Namely, the adder 1717 carries out an arithmetic operation of the value of M0 by using the output signals of the arithmetic circuits 1701, 1709 and 1713, the adder 1718 carries out an arithmetic operation of the value of M1 by using the output signals of the arithmetic circuits 1702, 1709 and 1713, the adder 1719 carries out an arithmetic operation of the value of M2 by using the output signals of the arithmetic circuits 1703, 1710 and 1713, the adder 1720 carries out an arithmetic operation of the value of M3 by using the output signals of the arithmetic circuits 1705, 1710 and 1713, the adder 1721 carries out an arithmetic operation of the value of M4 by using the output signals of the arithmetic circuits 1704, 1711 and 1714, the adder 1722 carries out an arithmetic operation of the value of M5 by using the output signals of the arithmetic circuits 1706, 1711 and 1714, the adder 1723 carries out an arithmetic operation of the value of M6 by using the output signals of the arithmetic circuits 1707, 1712 and 1714, and the adder 1724 carries out an arithmetic operation of the value of M7 by using the output signals of the arithmetic circuits 1708, 1712, and 1714.

The values of M0 to M7 thus obtained are inputted to the minimum value selector 1728, The minimum value selector 1728 selects a value of M0 to M7 that makes the metric value minimum. From the result of the selection, the value of $X_k$ is decided and outputted. The output becomes that of FDTS and, at the same time, is inputted to the delay 1731. The delay 1731 is for the delay of one time unit with the output thereof made as $X_{k-1}$. The output signal of the delay 1731 is then inputted to the delay 1732 and the arithmetic circuits 1715 and 1716.

The delay 1732 is for the delay of one time unit with the output thereof made as $X_{k-2}$. The output signal of the delay 1732 is inputted to the arithmetic circuit 1716.

The arithmetic circuits 1715 and 1716 carry out arithmetic operations of compensation values ($a_2 \cdot X_{k-1}$) and ($a_1 \cdot X_{k-1}$ + $a_2 \cdot X_{k-2}$) of $Y_{k-1}$ and $Y_k$ in the expression (5), respectively. The output signals of the arithmetic circuits 1715 and 1716 are inputted to the adders 1725 and 1726, respectively.

Now, going back to FIG. 13, the output of the FDTS detection circuit 1011 is inputted to the arithmetic circuit 1018.

In the embodiment, it is assumed that PR4 is employed. Therefore, the waveform equalization is carried out so that the impulse response $\{a_0, a_1, a_2\}$ becomes $\{1, 0, -1\}$. The arithmetic circuit 1018 carries out an arithmetic operation for obtaining the original PR4 output from a recorded code. Namely, with the output of the FDTS detection circuit 1011 at a time k taken as $X_k$, the arithmetic circuit 1018 carries out such an arithmetic operation that the output $X_k'$ of the arithmetic circuit 1018 satisfies the following expression (6).

$$X_k' = (X_k - X_{k-2}). \qquad (6)$$

The output of the arithmetic circuit 1018 is inputted to the multiplier 1014 and, at the same time, also to the multiplier 1015 through the delay 1013.

The delay 1017 is provided so as to adjust the timing of a signal inputted to both the delay 1012 and the multiplier 1015. Namely, the delay time in the delay 1017 is set so that the delay time thereat is the same as the time delay occurring at the FDTS detection circuit 1011 and the arithmetic circuit 1018. Since the combined delay time in the above FDTS detection circuit 1011 is equivalent to two time units, then the delay time set in the delay 1017 is set to the two time units under the assumption that no delay occurs in the arithmetic circuit 1018.

The output of the delay 1017 is inputted to the multiplier 1015 and to the multiplier 1014 through the delay 1012. Results of multiplication at the multipliers 1014 and 1015 are subjected to subtraction at the adder 1016 to provide the difference, from which a phase error signal representing an amount of phase error is provided as explained in the section of related art. Thus provided phase error signal is subjected to filtering processing by the loop filter 1037 to be given to the VCO 1036 as was explained before. The VCO 1036 slightly changes its oscillation frequency on the basis of the phase error signal subjected to filter processing to adjust a sampling timing.

According to the embodiment as explained above, application of the FDTS algorithm to the signal detection for phase error detection makes it possible to generate a more highly accurate phase error signal than that in signal detection by a comparison with a threshold value generally carried out in related art, by which a synchronous signal can be generated with higher accuracy. In addition, two time units of decoding delay for the signal detection provides so relatively short response time as to hardly affect on the frequency band for the phase control.

In the embodiment, the explanation is made about an example when the length of channel response is taken as 3 bits, namely, the impulse response is expressed as $\{a_0, a_1, a_2\}$. However, it is possible to provide the FDTS detection circuit with a configuration applicable to PR with an arbitrary length of impulse response. Therefore, the embodiment can be widely applied to not only the magnetic disk drive but also drives such as a magneto-optical disk drive and magnetic tape drive.

As the next, a storage unit will be explained which is a variation of the second embodiment.

The PR used for the magnetic recording includes a term (1−D) in the transfer function thereof due to magnetic characteristics. For example, the transfer function of PR4 is given as (1−D) (1+D), while in EPR4, (1−D) (1+D)$^2$. Here, when the output (1−D) for an appropriate processing of preceding is taken into consideration, possible values thereof is any one of 1, 0, and −1. This is characterized in that the output corresponding to the recording code "1" is provided so that 1 or −1 is alternately outputted, and the recording code corresponding to the recording code "0" becomes 0.

It is possible to shorten the range of FDTS search by drawing a state branching diagram with the output (1−D) taken as a reference and carrying out FDTS on the basis of the branching diagram to provide the FDTS with a simple configuration, Namely, with the three values 1, 0, −1 taken as inputs, it can be considered that (1+D) becomes a transfer function for PR4, and that (1+D)$^2$ for EPR4.

Assume that the transfer function in the second embodiment can be transformed as the following expression (7).

$$(a_0 + a_1 \cdot D + a_2 \cdot D^2) = (1-D) \cdot (b_0 + b_1 \cdot D). \qquad (7)$$

where the symbol "D" is an operator representing a delay of one time unit, and "D$^2$" representing a delay of two time units. The transfer function with the output (1−D) taken as a reference becomes ($b_0 + b_1 \cdot D$). In the storage unit in the variation, a register Sg is newly provided which holds by the output of (1−D) a code of an output corresponding to the data "1" to be recorded next. The value of Sg becomes either 1 or −1. At this time, the possible output of (1−D) at the next time k becomes $\{0, Sg\}$.

Figure 16:
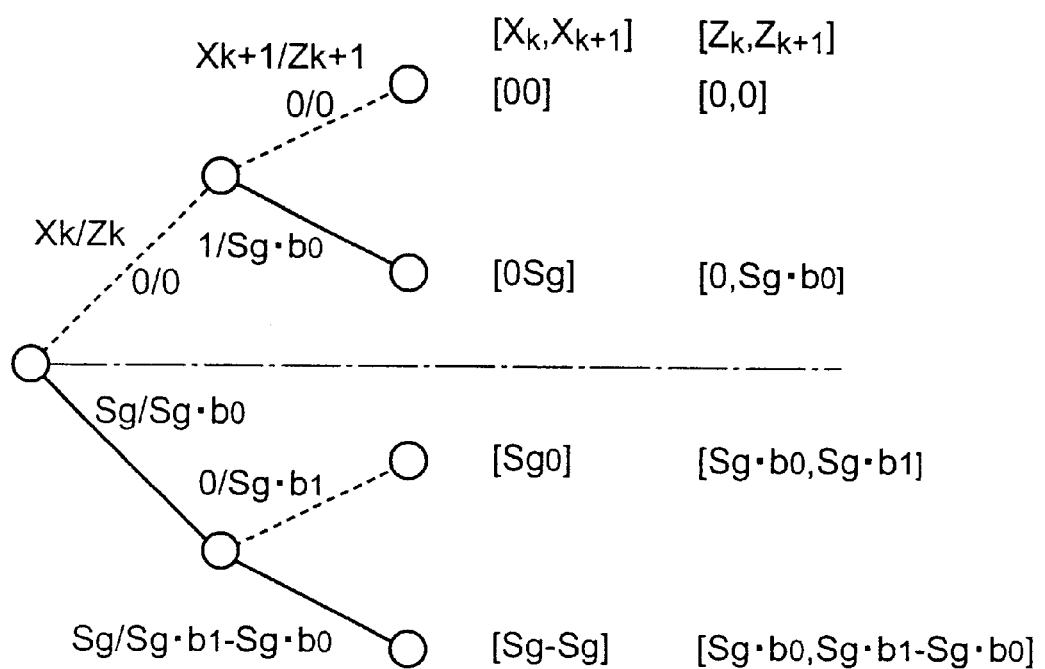
FIG. 16 is a diagram showing a tree structure of an FDTS in a variation of the second embodiment.

By noting that Sg and −Sg alternately given to the output (1−D) corresponding to the recording data "1", a diagram showing the state branching is drawn as shown in FIG. 16. In the diagram, broken lines represent branches corresponding to $X_n = 0$ and solid lines represent branches corresponding to $X_k = 1$ or $X_k = -1$. Numerical values in the diagram are those of $X_k/Z_k$ corresponding to respective branches, where $X_{k-1}$ and $X_{k-2}$ are assumed as $X_{k-1} = 0$ and $X_{k-2} = 0$, respectively. Like in the second embodiment, from the values of $Z_n$ corresponding to respective branches, values of evaluation function metrics are obtained, Namely, $$M0'(k) = Y_k'^2 + Y_{k+1}^2$$

$$M1'(k) = Y_k'^2 + (Y_{k-1} - Sg \cdot b_0)^2$$

$$M2'(k) = (Y_k' - Sg \cdot b_0)^2 + (Y_{k+1} - Sg \cdot b_1)^2$$

$$M3'(k) = (Y_k' - Sg \cdot b_0)^2 + (Y_{k-1} - Sg \cdot b_1 + Sg \cdot b_0)^2,$$

where $Y_k'$ is a value satisfying the following expression (8) with inter-symbol interference due to $X_{k-1}$ included in $Y_k$ being compensated. That is, $$Y_k' = Y_k - (b_1 \cdot X_{k-1}). \qquad (8)$$

Of the metric values M0'(k) to M3'(k), the one with the minimum value is selected. When the selected one with the minimum value is M0' or M1', the detection is made as $X_k=0$. When the selected one with the minimum value is M2' or M3', the detection is made as $X_k=Sg$ and, along with this, the value is updated with Sg made as Sg=−Sg. With this, a series of processing for one sampled data is completed with the processing of the next data followed for being similarly carried out.

Figure 17:
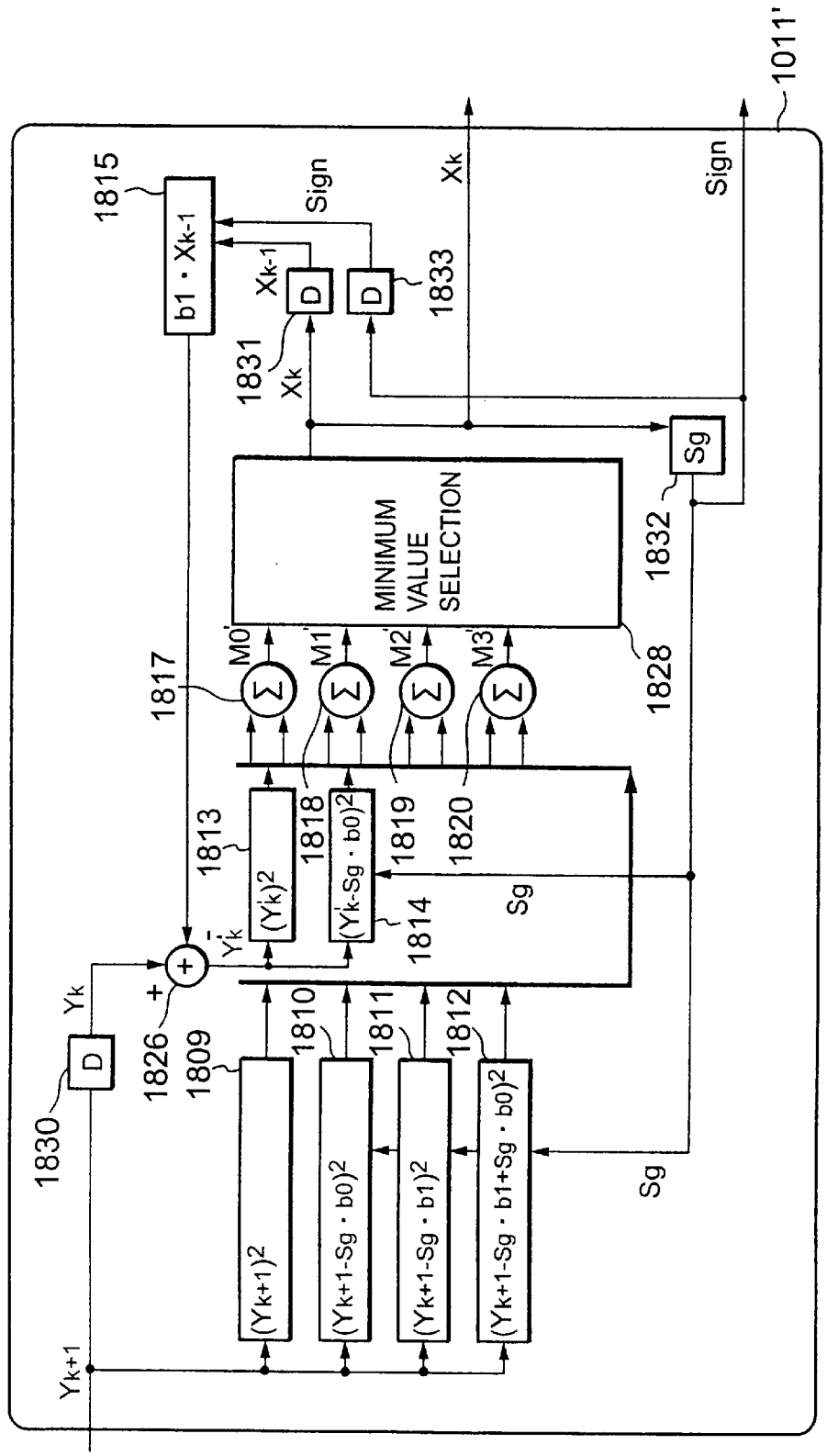
FIG. 17 is a block diagram showing an example of an FDTS detection circuit in the variation of the second embodiment.

FIG. 17 is a block diagram showing an example of an FDTS detection circuit by FDTS which realizes such a processing.

An FDTS detection circuit 1011' according to the example of the variation of the second embodiment has arithmetic circuits 1809 to 1815, adders 1817 to 1820, and 1826, delays 1830, 1831, and 1833, a register 1832, and a minimum value selector 1828.

Let $Y_{k+1}$ be an input signal to the FDTS detection circuit. The input signal is inputted to the arithmetic circuits 1809, 1810, 1811, and 1812 and the delay 1830. The arithmetic circuits 1809, 1810, 1811, and 1812 carries out an arithmetic operations of $(Y_{k+1})^2$, $(Y_{k-1}-Sg \cdot b_0)^2$, $(Y_{k-1}-Sg \cdot b_1)^2$, and $(Y_{k-1}-Sg \cdot b_1+Sg \cdot b_0)^2$, respectively.

The delay 1830 outputs an input signal with a delay of one time unit. Therefore, the output signal of the delay 1830 becomes the input signal $Y_k$ of one time unit before. An output signal of the delay 1830 is inputted to the adder 1826. The adder 1826, like the adders 1725 and 1726 in the second embodiment, compensates the influence of inter-symbol interference due to $X_{k-1}$. The output of the adder 1826 is inputted to the arithmetic circuits 1813 and 1814. The arithmetic circuits 1813 and 1814 carry out arithmetic operations of $(Y'_k)^2$ and $(Y'_k-Sg \cdot b_0)^2$, respectively.

The output signals of the arithmetic circuits 1809 and 1813 are inputted to the adder 1817 from which a sum of the inputted signals, i.e. the value of M0' is outputted, the output signals of the arithmetic circuits 1810 and 1813 are inputted to the adder 1818 from which a sum of the inputted signals, i.e. the value of M1' is outputted, the output signals of the arithmetic circuits 1811 and 1814 are inputted to the adder 1819 from which a sum of the inputted signals, i.e. the value of M2' is outputted, and the output signals of the arithmetic circuits 1812 and 1814 are inputted to the adder 1820 from which a sum of the inputted signals, i.e. the value of M3' is outputted.

The outputs of the adders 1817 to 1820 are inputted to the minimum value selector 1828. Of the outputs of the adders 1817 to 1820, the minimum value selector 1828 selects the one by which an inputted metric value becomes minimum thereby to output the value of corresponding $X_k$. The output becomes the output of the FDTS detection circuit 1011' as a result of detection. Furthermore, the output of the minimum value selector 1828 is also given to the delay 1831 and the register 1832.

Register 1832 is a register which holds a code (Sg) of the output (1−D) corresponding to the above recording code "1" and takes on the value of either "1" or "−1". The value of Sg is reversed when $X_k=1$ is outputted as an output of the FDTS detection circuit, and is held with the previous value being kept when $X_k=0$ is outputted. The output of the register 1832 is inputted to the arithmetic circuits 1810, 1811, 1812 and 1814 to be used for arithmetic operations in the respective arithmetic circuits, Moreover, the output of the register 1832 is also given to the delay 1833 to be also outputted externally as code data of the output $X_k$ of the FDTS detection circuit.

Each of the delays 1831 and 1833 is a delay circuit of one time unit. The delay circuit 1831 outputs the value of $X_{k-1}$ (1 or 0), and the delay circuit 1833 outputs the code of $X_{k-1}$ (+1 or −1). The outputs of the delay circuits 1831 and 1833 are inputted together to the arithmetic circuit 1815. The arithmetic circuit 1815 carries out an arithmetic operation of $b_1 \cdot X_{k-1}$ as a compensation value for an inter-symbol interference component. The output of the arithmetic circuit 1815 is inputted to the adder 1826.

With the FDTS detection circuit explained in the variation, it becomes possible to realize an FDTS detection circuit more simplified than the FDTS detection circuit according to the second embodiment.

Figure 18:
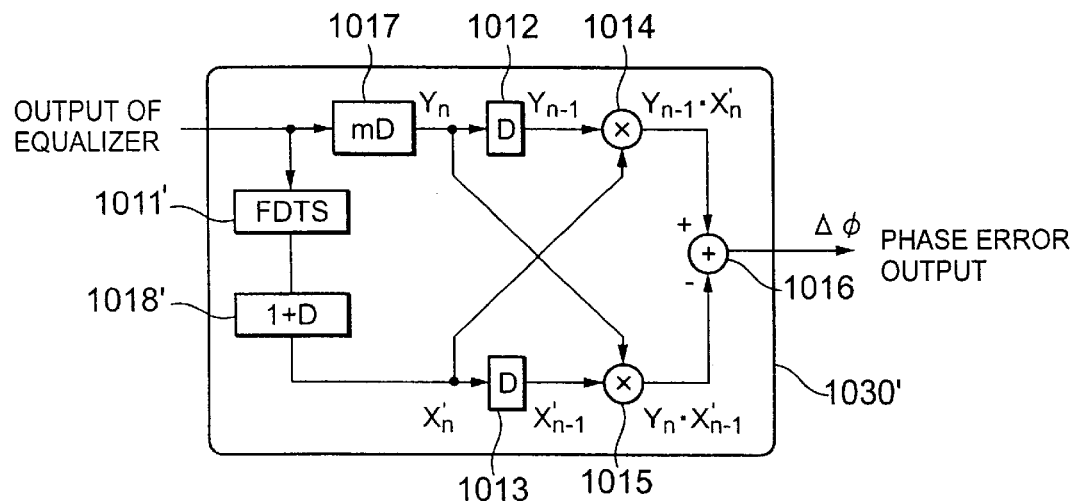
FIG. 18 is a block diagram showing a configuration of a phase error detector in the variation of the second embodiment.

FIG. 18 is a block diagram showing a configuration of a phase error detector 1030' using the above described FDTS detection circuit.

The phase error detector 1030' is basically configured similarly to the phase error detector 1030 shown in FIG. 13. However, the different points between the phase error detector 1030' and the phase error detector 1030 are in an FDTS detection circuit 1011', and an arithmetic circuit 1018' that processes an output of the FDTS detection circuit 1011'.

When an input signal to the arithmetic circuit 1018' at a time k is taken as $X_k$, the arithmetic circuit 1018' outputs a signal $X_k'$ as, $$X_k' = (X_k + X_{k-1}). \qquad (9)$$

In addition, the delay time in the delay 1017 is made shorter by one time unit compared with that in the second embodiment. This is due to the decoding delay time in the FDTS detection circuit 1011' made shortened by circuit simplification.

In other respects than those explained here, there is no particular difference from the phase error detector in the second embodiment. Therefore, explanation about them is omitted here.

Also with the variation as explained above, like in the second embodiment, a phase error signal can be generated with a high accuracy. Furthermore, more simplified configuration can be provided for the FDTS detection circuit compared with that in the second embodiment.

Next to this, as a further variation of the second embodiment, an information recording, and regenerating unit will be explained in which an accuracy of phase error detection is further improved compared with the information recording and reproducing apparatus in the second embodiment.

In the further variation of the second embodiment, a response waveform of EPR4 is used in the signal detection for phase comparison, and a response waveform of PR4 is used for phase error detection.

Figure 19:
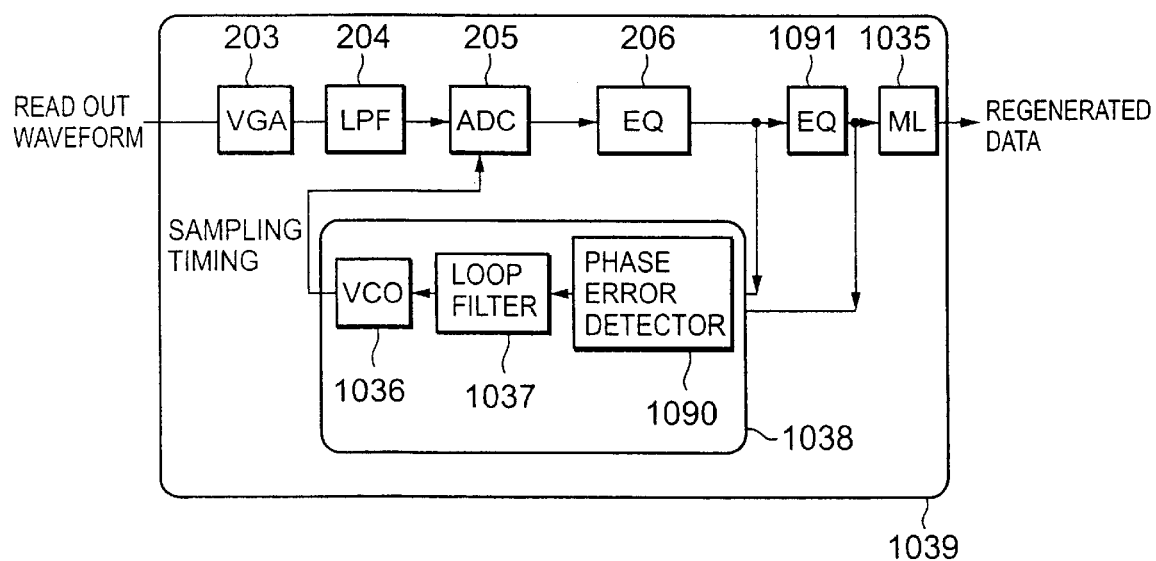
FIG. 19 is a block diagram showing a configuration of a data regenerating circuit as a signal regeneration system in a further variation of the second embodiment.

FIG. 19 is a block diagram showing a configuration of a data regenerating circuit 1039 in the further variation. In the figure, the same reference numerals designate functionally the same components as those shown in FIG. 12. In the following, main differences between the embodiment and that shown in FIG. 12 will be specifically explained.

In the data regenerating circuit 1039 according to the embodiment, a signal subjected to waveform equalization at the equalizer 206 so as to have the response waveform of PR4 is inputted to the synchronous signal generating circuit 1038 and, along with this, further inputted to an equalizer 1091. The equalizer 1091 carries out waveform equalization for outputting a response waveform of EPR4 from a response waveform of PR4 as an output signal of the equalizer 206. The response waveform of PR4 is made into the response waveform of EPR4 by using a filter having a transfer function (1+D). Such a filter is configured as a circuit realizing the arithmetic operation shown as the foregoing expression (9), When a system of a class higher than that of EPR4 is employed, a transfer function appropriate to the class can be applied to the equalizer 1091.

A Viterbi decoding circuit 1035 carries out data regeneration by the Viterbi algorithm about a signal outputted from the equalizer 1091 to decode the signal into binary data. At the same time, the output of the equalizer 206 (post equalization signal) is supplied to a phase error detector 1090.

The output of the equalizer 1091 is also supplied to the synchronous signal generating circuit 1038. The synchronous signal generating circuit 1038 generates, on the basis of the signals outputted from the equalizers 206 and 1091, a sampling clock for determining a timing of sampling at the analog to digital converter 205. The synchronous signal generating circuit 1038 is mainly constituted of the phase error detector 1090, the loop filter 1037, and the VCO 1036.

Figure 20:
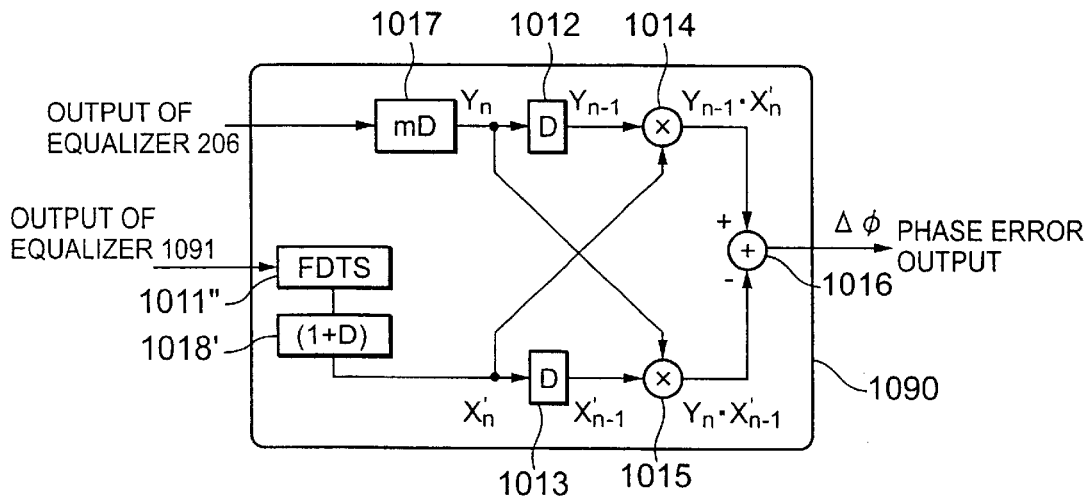
FIG. 20 is a block diagram showing a configuration of a phase error detector in the further variation of the second embodiment.

FIG. 20 is a block diagram showing a configuration of the phase error detector 1090 in the further variation. In the figure, the same components as those of the phase error detector 1030 shown in FIG. 13 are designated by the same reference numerals and characters.

In the variation, the output signal of the equalizer 206 is inputted to the delay 1017, and the output signal of the equalizer 1091 is inputted to an FDTS detection circuit 1011". The FDTS detection circuit 1011" carries out signal detection by FDTS algorithm with the configuration thereof provided for carrying out processing corresponding to the response waveform of EPR4. The number of delay stages in the delay 1017 is set so that it provides a delay time equal to the total of the delay times of the equalizer 1091, the FDTS detection circuit 1011", and the arithmetic circuit 1018'. Except these points, the phase error detector 1090 is also configured basically similarly to the phase error detector 1030 In the second embodiment.

The transfer function used in the embodiment is factorized as below as $$(1-D^2)(1+D)=(1-D)(1+2 \cdot D+D^2). \quad (10)$$

A transfer function with the term (1−D) omitted becomes $(1+2 \cdot D+D^2)$.

Figure 21:
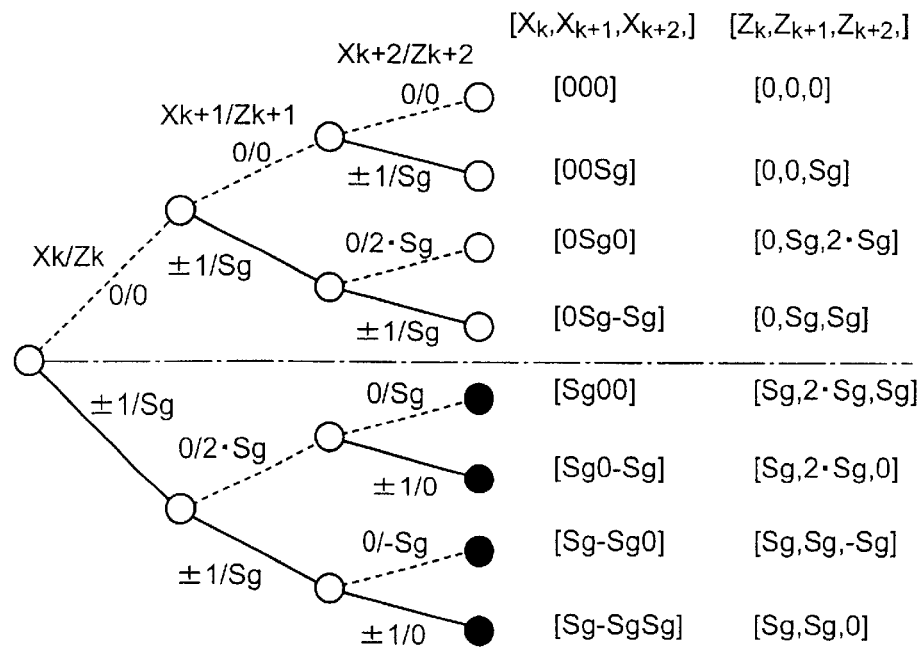
FIG. 21 is a diagram showing a tree structure of an FDTS, in the further variation of the second embodiment.

A state branching diagram drawn for PR with the input provided as being three values of $\{1, 0, -1\}$, and with the transfer function provided as $(1+2 \cdot D+D^2)$ is presented as shown in FIG. 21. In the diagram, broken lines represent branches corresponding to $X_n=0$, and solid lines represent those corresponding to $X_k=1$, or $X_k-1$. Numerical values in the diagram are those of $X_k/Z_k$ corresponding to respective branches, where it is assumed that $X_{k-1}=0$ and $X_{k-2}=0$.

The values of evaluation function metrics obtained from the values $Z_n$ corresponding to respective branches are presented as follows.

$$M0"(k)=(Y'_k)^2+(Y'_{k+1})^2+(Y'_{k+2})^2$$

$$M1"(k)=(Y'_k)^2+(Y'_{k+1})^2+(Y_{k+2}-Sg)^2$$

$$M2"(k)=(Y'_k)^2+(Y'_{k+1}-Sg)^2+(Y_{k+2}-2 \cdot Sg)^2$$

$$M3"(k)=(Y'_k)^2+(Y'_{k+1}-Sg)^2+(Y_{k+2}-Sg)^2$$

$$M4"(k)=(Y'_k-Sg)^2+(Y'_{k+1}-2 \cdot Sg)^2+(Y_{k+2}-Sg)^2$$

$$M5"(k)=(Y'_k-Sg)^2+(Y'_{k+1}-2 \cdot Sg)^2+(Y_{k+2})^2$$

$$M6"(k)=(Y'_k-Sg)^2+(Y'_{k+1}-Sg)^2+(Y_{k+2}+Sg)^2$$

$$M7"(k)=(Y'_k-Sg)^2+(Y'_{k+1}-Sg)^2+(Y_{k+2})^2$$

where $Y_k'$ and $Y_{k+1}'$ are values obtained from calculation of the expression (11) below as, $$Y_k'=Y_k-(X_{k-1}+2 \cdot X_{k-2})$$

$$Y_k'=Y_{k+1}-(X_{k-1}).$$

In signal detection, of the metric values, the one with the minimum value is selected. When the selected one with the minimum value is any one of M0", M1", M2" or M3", the detection is made as $X_k=0$. When the selected one with the minimum value is any one of M4", M5", M6" or M7", the detection is made as $X_k=Sg$. In the latter case, the value is updated with Sg also made as Sg=−Sg.

In the embodiment, in this way, a series of processing for one sampled data is carried out. When the processing is completed, the processing of the next data is followed for being similarly carried out.

According to the embodiment, with the above described procedure, a simplified signal detection by FDTS can be carried out which corresponds to EPR4. The signal detection with such a higher degree PR waveform makes it possible to carry out the signal detection with a higher accuracy compared with previously explained embodiments, so that an accurate phase error signal can be generated.

In the next, as a further another variation of the second embodiment, explanation will be made about a case in which the information recording and reproducing apparatus is provided as an optical disc drive. In this case, the class of PR is employed as, for example, the class 1 PR with the impulse response becoming as $\{a_0, a_1, a_2\}=\{1, 1, 0\}$. At this time, metric functions are calculated as the following expression.

$$M_k""=(Y_k-Z_k)^2+(Y_{k-1}-Z_{k+1})^2. \quad (12)$$

Therefore, $$M0""(k)=Y_k'^2+Y_{k+1}^2$$

$$M1""(k)=Y_k'^2+(Y_{k+1}-1)^2$$

$$M2""(k)=(Y_k'-1)^2+(Y_{k+1}-1)^2$$

$$M3""(k)=(Y_k'-1)^2+(Y_{k+1}-2)^2,$$

where $Y_k'$ is a value calculated from the following expression (13) as, $$Y_k'=(Y_k-X_{k-1}). \quad (13)$$

In the signal detection, four metric values are compared with one another for selecting the minimum metric value. When the selected metric value is M0"" or M1"", the detection is made as $X_k=0$. While, when the selected metric value is M2"" or M3"", the detection is made as $X_k=1$. Like in other embodiments, by providing the circuit configuration on the basis of the above expression for detection, a configuration of the FDTS circuit can be provided which corresponds to the class 1 PR.

Figure 22:
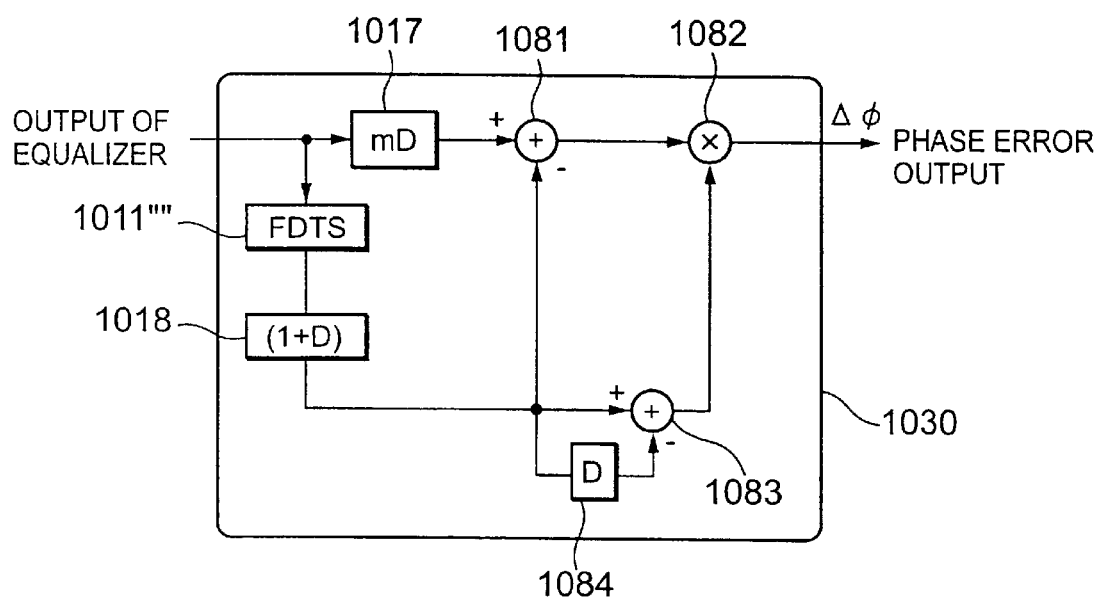
FIG. 22 is a block diagram showing a configuration of a phase error detector in a further another variation of the second embodiment.

FIG. 22 is a block diagram showing a configuration of a phase error detector 1030 in the further another variation of the second embodiment. In the diagram, an FDTS detection circuit 1011"" carries out the signal detection by the FDTS algorithm on the basis of the above described metric functions. The delay circuit 1017 is the one for a delay of m time units. The value m is determined depending on the delay time in the FDTS detection circuit 1011"". The arithmetic circuit 1018 carries out an arithmetic operation represented as (1+D) on the output of the FDTS detection circuit 1011"". With this processing, the original output signal of the class 1 PR can be obtained. An adder 1081 carries out subtraction of $Z_k$ subjected to the signal detection from the outputted value of the equalizer to obtain equalization error. A delay circuit 1084 is one for outputting an inputted signal with a delay of one time unit. An adder 1083 obtains the difference between the input signal and the output signal of the delay circuit 1084. A multiplier 1082 obtains a product of the output of the adder 1083 and the output of the adder 1081.

The output of the arithmetic circuit 1018 takes any one of the values "0", "1", and "2". Letting the outputted value be $W_k$, an arithmetic operation $W_k - W_{k-1}$ is carried out by a circuit constituted of the delay circuit 1084 and the adder 1083. The result of the arithmetic operation is obtained as an output of the adder 1083. From the output, an inclination of the regenerated waveform at a time k can be easily decided. Namely, when $(W_k - W_{k-1}) = 0$, there is no inclination, when $(W_k - W_{k-1}) = 1$, a positive inclination, and when $(W_k - W_{k-1}) = -1$, a negative inclination. In the class 1 PR, it is impossible that the output changes from 0 to +2, or from +2 to 0 in one time unit. Therefore, the output of the adder 1083 is always any one of $\{+1, 0, -1\}$.

By multiplying thus obtained inclination of the regenerated waveform by the equalization error obtained at the adder 1081, a value corresponding to a phase error $\Delta\Phi$ can be obtained. The multiplication processing is carried out at the multiplier 1082.

As explained in the foregoing, by using a highly accurate phase error detector, the influence of an error in level detection on the phase error signal can be reduced, by which it becomes possible to carry out a highly accurate phase error detection. Moreover, an improvement in accuracy is accompanied by no extreme increase in the delay time, for phase control. Thus, it is possible to carry out the phase control over a wide frequency band. As a result, it becomes possible to provide an information recording and reproducing apparatus which is capable of performing a high density recording and a high-speed operation.

What is claimed is:

1. An information regenerating apparatus comprising:
   a recording medium having recorded information;
   a read out circuit which generates a regenerated signal corresponding to recorded information from the recording medium;
   a conversion circuit which carries out sampling of the regenerated signal on a basis of a supplied clock signal to convert the regenerated signal to gain information;
   a regenerating circuit which carries out a signal detection on a basis of the gain information to output digital data corresponding to the information;
   a phase error detecting circuit which carries out a phase error signal detection using a delay circuit carrying out a delayed sampling from the conversion circuit, a detection circuit having same detection capability of the regenerating circuit, an arithmetical operation circuit calculating output of the detection circuit, a phase calculate circuit calculating the phase error signal based on outputs of the delayed sampling and the arithmetical operation circuit, a delay circuit for carrying out gain information from an output of the conversion circuit, and a Fixed Delay Tree Search (FDTS) circuit for regenerating data using at least one piece of an output of the delay circuit on a basis of a FDTS algorithm, which detects maximum likelihood detected data within a finite period by using the output of the delay circuit; and
   an oscillation circuit which adjusts the clock signal on a basis of the phase error signal obtained by the phase error detecting circuit.

2. The information regenerating apparatus as claimed in claim 1, wherein the conversion circuit comprises:
   an analog to digital conversion circuit which carries out sampling of the regenerated signal on a basis of the supplied clock signal to output a digital value corresponding to the regenerated signal; and
   an equalizer which carries out waveform equalization based on the digital value to output the gain information corresponding to the information.

3. An information regenerating apparatus comprising:
   a recoding medium having recorded information;
   a read out circuit which generates a regenerated signal corresponding to recorded information from the recording medium;
   a conversion circuit which carries out sampling of the regenerated signal on a basis of a supplied clock signal to convert the regenerated signal to gain information;
   a regenerating circuit which carries out a signal detection on a basis of the gain information to output digital data corresponding to the information;
   a phase error detecting circuit which carries out a phase error signal detection using a delay circuit carrying out a delayed sampling from the conversion circuit, a detection circuit having a same detection capability of the regenerating circuit, an arithmetical operation circuit calculating an output of the detection circuit, and a phase calculate circuit calculating the phase error signal based on outputs of the delayed sampling and the arithmetical operation circuit;
   a phase error compensating circuit which determines a compensated phase error signal calculated by the phase error signal from the phase error detecting circuit and a phase compensating signal which is calculated by the sampling of the regenerated signal and the signal detection coming from the regenerating circuit; and
   an oscillation circuit which adjusts the clock signal on a basis of the compensated phase error signal obtained by the phase error compensating circuit.

4. The information regenerating apparatus as claimed in claim 3, wherein the conversion circuit comprises:
   an analog to digital conversion circuit which carries out sampling of the regenerated signal on a basis of the supplied clock signal to output a digital value corresponding to the regenerated signal; and
   an equalizer which carries out waveform equalization based on the digital value to output the gain information corresponding to the information.

5. A system comprising:
   at least one of: a host, a central processor unit, an information processing unit; and,
   an information regenerating apparatus including:
      a recording medium having recorded information;
      a read out circuit which generates a regenerated signal corresponding to recorded information from the recording medium;
      a conversion circuit which carries out sampling of the regenerated signal on a basis of a supplied clock signal to convert the regenerated signal to gain information;
      a regenerating circuit which carries out a signal detection on a basis of the gain information to output digital data corresponding to the information;
      a phase error detecting circuit which carries out a phase error signal detection using a delay circuit carrying out a delayed sampling from the conversion circuit, a detection circuit having same detection capability of the regenerating circuit, an arithmetical operation circuit calculating output of the detection circuit, a phase calculate circuit calculating the phase error signal based on outputs of the delayed sampling and the arithmetical operation circuit, a delay circuit for carrying out gain information from an output of the conversion circuit, and a Fixed Delay Tree Search (FDTS) circuit for regenerating data using at least one piece of an output of the delay circuit on a basis of a FDTS algorithm, which detects maximum likelihood detected data within a finite period by using the output of the delay circuit; and an oscillation circuit which adjusts the clock signal on a basis of the phase error signal obtained by the phase error detecting circuit.

6. The system as claimed in claim 5, wherein the conversion circuit comprises:
   an analog to digital conversion circuit which carries out sampling of the regenerated signal on a basis of the supplied clock signal to output a digital value corresponding to the regenerated signal; and
   an equalizer which carries out waveform equalization based on the digital value to output the gain information corresponding to the information.

7. A system comprising:
   at least one of: a host, a central processor unit, an information processing unit; and,
   an information regenerating apparatus including:
   a recoding medium having recorded information;
   a read out circuit which generates a regenerated signal corresponding to recorded information from the recording medium;
   a conversion circuit which carries out sampling of the regenerated signal on a basis of a supplied clock signal to convert the regenerated signal to gain information;
   a regenerating circuit which carries out a signal detection on a basis of the gain information to output digital data corresponding to the information;
   a phase error detecting circuit which carries out a phase error signal detection using a delay circuit carrying out a delayed sampling from the conversion circuit, a detection circuit having a same detection capability of the regenerating circuit, an arithmetical operation circuit calculating an output of the detection circuit, and a phase calculate circuit calculating the phase error signal based on outputs of the delayed sampling and the arithmetical operation circuit;
   a phase error compensating circuit which determines a compensated phase error signal calculated by the phase error signal from the phase error detecting circuit and a phase compensating signal which is calculated by the sampling of the regenerated signal and the signal detection coming from the regenerating circuit; and
   an oscillation circuit which adjusts the clock signal on a basis of the compensated phase error signal obtained by the phase error compensating circuit.

8. The system as claimed in claim 7, wherein the conversion circuit comprises:
   an analog to digital conversion circuit which carries out sampling of the regenerated signal on a basis of the supplied clock signal to output a digital value corresponding to the regenerated signal; and
   an equalizer which carries out waveform equalization based on the digital value to output the gain information corresponding to the information.

* * * * *